(12) United States Patent
Nakano

(10) Patent No.: US 8,968,952 B2
(45) Date of Patent: Mar. 3, 2015

(54) ELECTRONIC EQUIPMENT PROVIDED WITH BATTERY CHECK DEVICE

(75) Inventor: Shingo Nakano, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1098 days.

(21) Appl. No.: 12/972,335

(22) Filed: Dec. 17, 2010

(65) Prior Publication Data

US 2011/0091783 A1 Apr. 21, 2011

Related U.S. Application Data

(62) Division of application No. 11/580,101, filed on Oct. 13, 2006, now Pat. No. 7,939,214.

(30) Foreign Application Priority Data

Oct. 31, 2005 (JP) ................................. 2005-317182

(51) Int. Cl.
H01M 8/04 (2006.01)

(52) U.S. Cl.
CPC ...... *H01M 8/04559* (2013.01); *H01M 8/04119* (2013.01); *H01M 8/04223* (2013.01); *Y02E 60/50* (2013.01)
USPC ....................................................... 429/432

(58) Field of Classification Search
CPC .............. H01M 8/04; H01M 8/04082; H01M 8/04223; H01M 8/04298; H01M 8/04313; H01M 8/04537; H01M 8/04604; H01M 8/04619; H01M 8/04634; H01M 8/04925; H01M 8/04494; H01M 8/04992; H01M 8/04559; H01M 8/04119; Y02E 60/50
See application file for complete search history.

(56) References Cited

U.S. PATENT DOCUMENTS

| 5,528,335 A | 6/1996 | Terunuma |
| 6,057,051 A | 5/2000 | Uchida et al. |
| 6,563,766 B1 | 5/2003 | Nakamiya |
| 2007/0048568 A1 | 3/2007 | Nakamura et al. .............. 429/22 |

(Continued)

FOREIGN PATENT DOCUMENTS

| CN | 1299975 | 6/2001 |
| JP | 5-47394 | 2/1993 |
| JP | 7-92523 A | 4/1995 |

(Continued)

OTHER PUBLICATIONS

Chinese Official Action dated Feb. 15, 2008 in Chinese Application No. 2006101498927.

*Primary Examiner* — Raymond Alejandro

(74) *Attorney, Agent, or Firm* — Fitzpatrick, Cella, Harper & Scinto

(57) ABSTRACT

Immediately after a main switch is turned ON, a battery check is performed based on a first inhibit voltage lower than a second reference voltage which is an inhibit voltage level a predetermined time period after the main switch is turned ON, and therefore, even when the voltage is in a low state immediately after the main switch is turned ON, it is possible to activate a camera without an erroneous detection. Further, when the elapsed time from a time when the main switch is turned OFF to a time when tuned ON next time is relatively long, a solid high polymer film inside the fuel cell is assumed to be further dried, then the first inhibit voltage is changed, and therefore, even when the voltage fluctuates depending on the humidifying state immediately after the main switch is turned ON, an appropriate battery check can be performed.

2 Claims, 17 Drawing Sheets

(56) References Cited

U.S. PATENT DOCUMENTS

2009/0230767 A1    9/2009   Ikuma et al.
2010/0055514 A1*   3/2010   Pearson .......................... 429/13

FOREIGN PATENT DOCUMENTS

| | | |
|---|---|---|
| JP | 9-213359 A | 8/1997 |
| JP | 11-44901 | 2/1999 |
| JP | 11-230813 | 8/1999 |
| JP | 2003-234116 A | 8/2003 |
| JP | 2003-295284 A | 10/2003 |
| JP | 2004-212826 | 7/2004 |
| JP | 2004-220844 | 8/2004 |
| JP | 2005-243568 | 9/2005 |
| WO | 2004093288 | 10/2004 |

\* cited by examiner

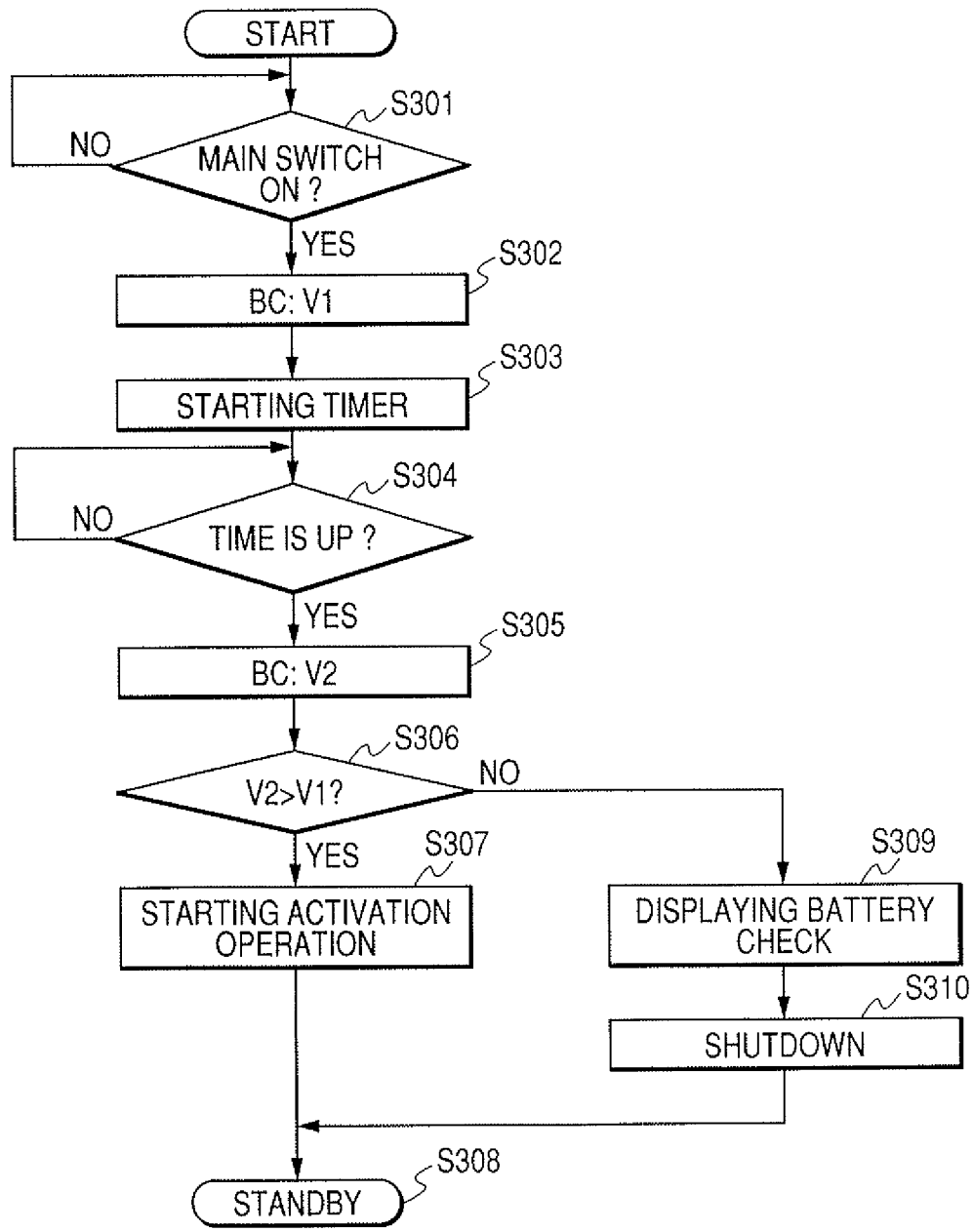

ELECTRONIC EQUIPMENT PROVIDED WITH BATTERY CHECK DEVICE

This application is divisional of U.S. patent application Ser. No. 11/580,101, filed Oct. 13, 2006, which has since issued as U.S. Pat. No. 7,939,214 on May 10, 2011, the contents of which are incorporated by reference herein.

BACKGROUND OF THE INVENTION

1. Field of the Invention

The present invention relates to electronic equipment which functions with power supplied by battery, and particularly, to electronic equipment having check device for battery life.

2. Description of the Related Art

In general, there exist various types of electronic equipment which function with power supplied by battery. In supplying power particularly in the electronic equipment usable outdoors, the battery life is a major issue.

Here, as a representative for electronic equipment usable outdoors, a camera will be exemplified and described. There exist a generally known digital camera, in which an object image incident through a photographing lens is photoelectrically converted by a solid state image pickup element such as CCD and the like, and this photoelectrically converted image signal is A/D converted to be recorded on a recording medium, and further, an image can be displayed by a built-in liquid crystal monitor.

Particularly, a single lens reflex camera with exchangeable photographing lens is required to have good operability and high-speed continuous photographing performance similarly to a silver film camera, pick up an image with high quality and have a wide brightness range of the object to be taken, for example. For that reason, it is necessary to adopt the image pickup element which has a large number of pixels and is highly sensitive. Furthermore, as compared with the silver film camera, a large scale electrical circuit using a large number of electrical parts such as an imaging circuit, image processing circuit, image display circuit and the like is added.

As a result, in the digital single lens reflex camera, a power consumption is large, and a battery capable of supplying sufficient energy is required. On the other hand, as the miniaturization and light-weight of the camera advances, it is increasingly difficult for the conventional primary battery or secondary battery to supply sufficient energy for driving the camera.

As a solution for such problem, an attention is paid to a compact fuel cell. The fuel cell is high in power generating efficiency as compared with the conventional generating system, and moreover, its waste is clean. In addition, since an amount of supplied energy is nearly several to several tens times that of the conventional battery per cubic content and weight, it is said that the fuel cell is useful as a power source for compact electronic equipment.

Hereinafter, a principle of power generation in the fuel cell will be described. The fuel cell supplies fuel gas containing hydrogen to a fuel electrode, and supplies oxygen gas containing oxygen to an oxygen electrode, thereby obtaining an electromotive force through electro-chemical reaction arisen at both electrodes. Hydrogen supplied to the fuel electrode is separated by catalytic agent into proton and electron. The separated electron moves to the oxygen electrode via an external circuit, and proton moves to the oxygen electrode through a solid high polymer film (high polymer electrolyte film). In the oxygen electrode, proton, electron and oxygen are combined to generate water and carbon dioxide.

The electro-chemical reaction arisen at the fuel cell will be shown. A formula (1) represents a reaction arisen at the fuel electrode, a formula (2) represents a reaction arisen at the oxygen electrode, and a formula (3) represents a reaction arisen at the entire battery.

$$H_2 \rightarrow 2H^+ + 2e^- \tag{1}$$

$$(\tfrac{1}{2})O_2 + 2H^+ + 2e^- \rightarrow H_2O \tag{2}$$

$$H_2 + (\tfrac{1}{2})O_2 \rightarrow H_2O \tag{3}$$

FIG. 16A is a top plan view showing one example of the fuel cell, and FIG. 16B is a front view thereof. This fuel cell takes oxygen used for reaction as an oxidant from the outside air, and therefore, the upper surface, under surface, and longitudinal side surface of a body frame 70 are provided with an air pit 73 for taking in the outside air. This air pit 73 serves to vent the generated water as moisture vapor and also serves to vent the heat generated by the reaction. The other short side surface of the body frame 70 is provided with an electrode 72 for drawing electricity.

On the other hand, the interior of the body frame 70 is composed of a cell portion 71 consisting of more than one cell including a fuel electrode 113, a high polymer electrolyte film 112, an oxygen electrode 111. It is further composed of a fuel tank 76 for storing a fuel, a fuel supply route 75 connecting the fuel tank 76 and each cell portion 71, and a pressure sensor 77 for measuring the pressure of the fuel.

The fuel-cell cell thus configured has an electromotive force about 0.8 V and an electric current density about 300 mA/cm$^2$, and for example, the size of an unit cell is specified to about 1.2 cm×2 cm. When eight pieces of this fuel-cell cell is connected in series, the output of the entire battery becomes about 6.4 V and 720 mA, resulting in about 4.6 W. In FIGS. 16A and 16B, while the fuel-cell cell is shown with two laminated sheets of the cells each having the same area, a large number of laminated sheets connected in series as described above can provide a high voltage.

The interior of the fuel tank 76 is filled with hydrogen absorbing alloys capable of absorbing hydrogen. Since the withstand pressure of solid high polymer film used in the fuel cell is 0.3 to 0.5 MPa, it is necessary to use the film within the range where the differential pressure with the outside air is 0.1 MPa.

As the hydrogen absorbing alloys having a property of 0.2 MPa in the release pressure of hydrogen at normal temperature, LaNi$^5$ and the like are used. Since LaNi$^5$ can absorb and desorb hydrogen of 1.1 wt %, the amount of hydrogen stored in the fuel tank 76 is 0.4 g, and energy capable of generating the power is about 11.3 W·hr, which is about four times that of the conventional lithium ion battery. On the other hand, when a hydrogen absorbing material exceeding 0.2 MPa in release pressure of hydrogen at normal temperature is used, it is necessary to provide a pressure reducing valve 78 between the fuel tank 76 and the fuel electrode 113.

Hydrogen stored in the fuel tank 76 is supplied to the fuel electrode 113 through the fuel supply route 75. The outside air is supplied to the oxygen electrode 111 through the air pit 73. Electricity generated by the fuel cell is supplied from the electrode 72 to the electronic equipment which is to be driven.

A part of each electrode contacting water is insulated so that the electrodes of the fuel cell are not energized through the water for electrolysis when being charged. One method of insulation is to coat a part not contacting the solid high polymer film of the electrode with insulating material.

In the fuel cell thus configured, when proton moves to the oxygen electrode through the solid high polymer film, and if the solid high polymer film is dried, an electric resistance value of the solid high polymer film is increased. As a result, the power loss in generation of electric power becomes large, and the power generating capacity of the solid high polymer type fuel cell becomes small, that is, the voltage that can be generated becomes low.

Thus, immediately after the fuel cell starts to supply power, the voltage that can be generated becomes low. Particularly, in the fuel cell left unused for a long period of time, the solid high polymer film is further dried, and the voltage that can be generated at a start-up time becomes much lower. In FIG. 17, an example of the discharge curve of the fuel cell left unused for a long period of time is shown. The axis of ordinate represents the voltage V, and the axis of abscissas represents the time T. In FIG. 17, at a start-up time, since the solid high polymer film is in a dried state, the voltage that can be generated becomes low. After that, as the power generation progresses, the solid high polymer film is gradually humidified by $H_2O$ generated by the reaction of the formula (2), and the power loss is reduced, and the discharge curve ascends. Then, when the supply of hydrogen stops, the discharge curve descends.

As a power source system using such solid high poly film type fuel cell, a method of humidifying the solid high polymer film to prevent the voltage that can be generated at a start-up time, from becoming low is widely under review. For example, according to the fuel cell device disclosed in Japanese Patent Application Laid-Open No. H09-213359, a water-holding material is disposed inside the fuel cell, and $H_2O$ generated when the power is outputted is stored in the water-holding material. Then, at a start-up time, hydrogen is let pass through the water-holding material, so that the humidifying of the solid high polymer film is performed.

Further, according to the control method and the control device of the fuel cell as disclosed in Japanese Patent Application Laid-Open No. 2003-234116, separately from the fuel cell, a secondary battery and a capacitor are provided, and at a start-up time, the power is supplied from the secondary battery and the capacitor.

Incidentally, to comfortably use the electronic equipment, it is necessary to accurately know a remaining power of the battery as a power source. Hence, a number of the electronic equipment are provided with a remaining amount detecting device of the battery capacity, and they are configured such that a voltage check (battery check) of the built-in battery be made at the operating time.

As a battery check, there is known a method in which the battery is applied with a load for the predetermined time (that is, the load is energized), thereby letting the battery voltage drop, and it is determined whether the dropped battery voltage is equal to or more than the predetermined level. As a result of performing the battery check, if the battery voltage is equal to or more than the predetermined level, the procedure proceeds to the next sequence operation, and the camera is activated. On the contrary, if the battery voltage is below the predetermined level, the camera is not activated. This battery check is performed, for example, when the half depression operation (operation for starting the photographing preparation such as photometry, distance measuring, and the like) of the release button of the camera or the main switch is performed or performed in the midst of photographing sequences (for example, immediately before a shutter charge is performed after the shutter completes a travel motion) of the camera.

In the equipment using the fuel cell as a power source which uses hydrogen supplied from a hydrogen gas cylinder as a fuel, as the remaining amount of hydrogen decreases, hydrogen pressure is lowered. Hence, there exists a technology as a known technology, in which the pressure inside the hydrogen gas cylinder and the hydrogen pressure discharged from the hydrogen gas cylinder are detected, thereby performing the detection of the remaining amount of hydrogen.

Further, as a method of the battery check at the side of camera which uses the fuel cell using fuel liquid such as methanol and the like as a power source, there exists a method of confirming the remaining amount of the fuel liquid from the outside of the camera by visual observation (for example, see Japanese Patent Application Laid-Open No. 2003-295284).

Further, as the remaining amount detecting device of the fuel cell, there are many devices proposed based on the technology of calculating the remaining amount of the battery capacity from the initial amount and the used amount. For example, in Japanese Patent Application Laid-Open No. H11-230813, there is disclosed a device for calculating the remaining amount of the battery capacity from the initial fuel amount and the used amount.

As described above, in the electronic equipment mounted with the fuel cell, the executing of the battery check is required. In this case, for example, in the remaining amount detection which is disclosed in Japanese Patent Application Laid-Open No. H11-230813, a flow meter and an ampere meter are required, and this causes a cost up and the like.

Hence, it becomes effective to perform the battery check by applying a load for the predetermined time to the battery (that is, the load is energized) to drop the battery voltage, and determining whether the dropped battery voltage is equal to or more than the predetermined level. If this technique is adapted, the configuration of the battery can be made simple, and the miniaturization of the electronic equipment is not hampered, thereby a cost up can be controlled.

However, as already described, if the fuel cell is used, the voltage at a start-up time is low, and therefore, when compared with the reference voltage at the start-up time, it is sometimes determined as an inhibit voltage level (voltage level dropping below the voltage by which the camera is operable). That is, there arises a problem that, despite of the fact that in reality the driving of the camera is possible, it is determined that the camera cannot be driven.

It is conceivable that the voltage at a start-up time is compensated by the technology disclosed in Japanese Patent Application Laid-Open No. H09-213359 and Japanese Patent Application Laid-Open No. 2003-234116, so that such a problem does not occur. However, in the fuel cell disclosed in Japanese Patent Application Laid-Open No. H09-213359, a space for disposing the water-holding material inside the fuel cell is required, and this makes further miniaturization of the fuel cell difficult. Further, since the water-holding material is required, this causes a cost up. While, in the control method and the control device of the fuel cell disclosed in Japanese Patent Application Laid-Open No. 2003-234116, separately from the fuel cell, the secondary battery and the capacitor are required, and this not only hampers the miniaturization of the camera, but also leads to the cause of a cost-up.

SUMMARY OF THE INVENTION

The present invention has been carried out in view of the above described problems, and one of the objects of the invention is to make an appropriate batter check possible, while controlling a cost up without obstructing the miniaturization of the electronic equipment.

The electronic equipment as one aspect of the present invention is characterized by comprising a fuel cell for supplying an electrical power; and a battery check unit, which compares the voltage of the fuel cell with a first reference voltage in a predetermined time period after the power is supplied by the fuel cell and compares the voltage of the fuel cell with a second reference voltage higher than the first reference voltage after the predetermined time period.

The electronic equipment as further another aspect of the present invention is characterized by comprising a fuel cell for supplying an electrical power; and a battery check unit, which compares the voltage of the fuel cell caused by a first load with a reference voltage in a predetermined time period after the power is supplied by the fuel cell and compares the voltage of the fuel cell caused by a second load smaller than the first load with the reference voltage after the predetermined time period.

The electronic equipment as further another aspect of the present invention is characterized by comprising a fuel cell for supplying an electrical power; and a battery check unit, which compares a first voltage of the fuel cell detected after the power is supplied by the fuel cell, with a second voltage of the fuel cell detected a predetermined time after the detection of the first voltage.

The control method of the electronic equipment as one aspect of the present invention is a control method of the electronic equipment including a fuel cell for supplying an electrical power, characterized by a battery check step of comparing the voltage of the fuel cell with a first reference voltage in a predetermined time period after the power is supplied by the fuel cell, and comparing the voltage of the fuel cell with a second reference voltage higher than the first reference voltage after the predetermined time period.

The control method of the electronic equipment as another aspect of the present invention is a control method of the electronic equipment comprising a fuel cell for supplying an electrical power, characterized by a battery check step of comparing the voltage of the fuel cell caused by the first load with the reference voltage in a predetermined time period after the power is supplied by the fuel cell, and comparing the voltage of the fuel cell caused by the second load smaller than the first load with the reference voltage after the predetermined time period.

The control method of the electronic equipment as further another aspect of the present invention is a control method of the electronic equipment comprising a fuel cell for supplying an electrical power, characterized by a battery check step of comparing the first voltage of the fuel cell detected after the power is supplied by the fuel cell, with the second voltage of the fuel cell detected a predetermined time after the detection of the first voltage.

A computer program as one aspect of the present invention is a computer program for controlling the electronic equipment comprising the fuel cell for performing the power supply, characterized by allowing the computer to perform a battery check step of comparing the voltage of the fuel cell with a first reference voltage in a predetermined time period after the power is supplied by the fuel cell, and comparing the voltage of the fuel cell with the second reference voltage higher than the first reference voltage after the predetermined time period.

A computer program as another aspect of the present invention is a computer program for controlling the electronic equipment comprising the fuel cell for performing the power supply, characterized by allowing the computer to perform the battery check step of comparing the voltage of the fuel cell caused by the first load with the reference voltage in a predetermined time period after the power is supplied by the fuel cell and comparing the voltage of the fuel cell caused by the second load smaller than the first load with the reference voltage after the predetermined time period.

A computer program as another aspect of the present invention is a computer program for controlling the electronic equipment comprising the fuel cell for performing the power supply, characterized by allowing the computer to perform a battery check step of comparing the first voltage of the fuel cell detected after the power is supplied by the fuel cell, with the second voltage of the fuel cell detected a predetermined time after the detection of the first voltage.

Further features of the present invention will become apparent from the following description of exemplary embodiments with reference to the drawings.

BRIEF DESCRIPTION OF THE DRAWINGS

FIG. 15 is a flowchart for explaining the processing operation of the digital single lens reflex camera of a fifth embodiment.

DESCRIPTION OF THE EMBODIMENTS

Preferred embodiments of the present invention will be described in detail in accordance with the accompanying drawings.

First Embodiment

Figure 1:
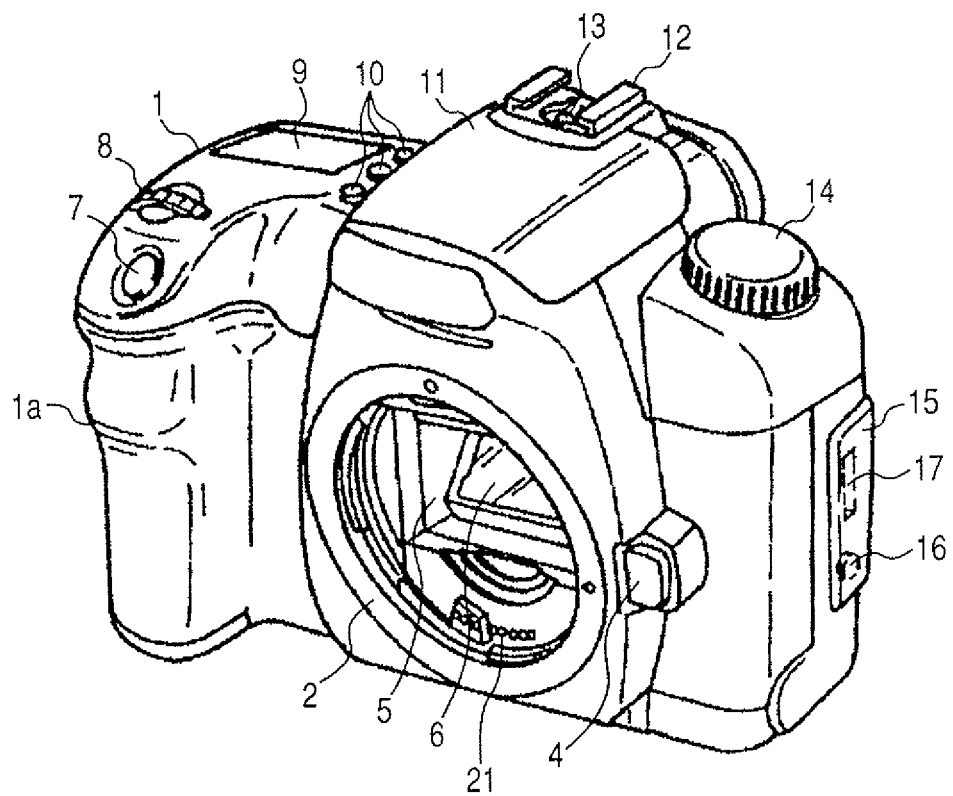
FIG. 1 is an external view of a digital single lens reflex camera of the present embodiment.
Figure 2:
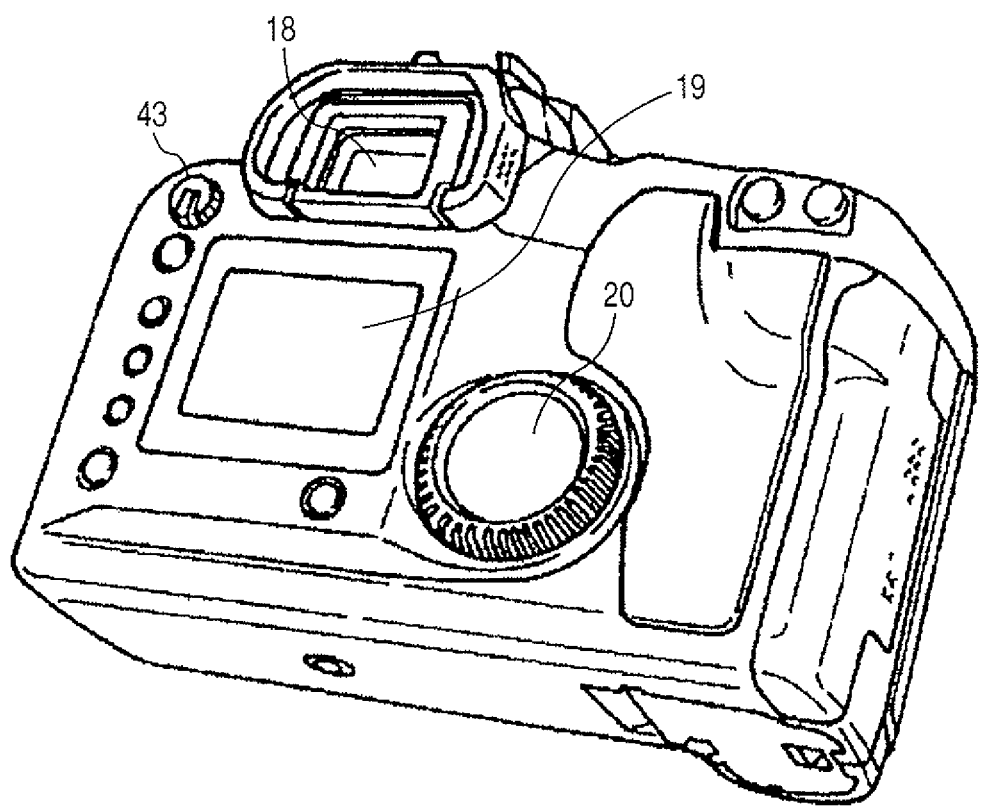
FIG. 2 is an external view of a digital single lens reflex camera of the present embodiment.

Electronic equipment to which the present invention is applied will be described by exemplifying a digital single lens reflex camera as an example. FIGS. 1 and 2 are external views of the digital single lens reflex camera of the present embodiment. FIG. 1 is an oblique view viewed from a camera front side, and shows a state in which a photographing unit (not shown) is dismounted. FIG. 2 is an oblique view viewed from a camera back surface side. A camera body frame 1 is provided with a grip portion 1a protruding in front so that a user can stably easily grip the camera at the photographing time.

A mount portion 2 provided in the camera body frame 1 is a region to which the photographing lens unit (not shown) is detachably mounted. A mount contact point 21 of the mount portion 2 transfers a control signal, a state signal, a data signal, and the like between the camera main body and the photographing lens unit, and also has a function of supplying electric currents of various types of voltages. The mount contact point 21 may be configured such that not only electrical communications, but also optical communications, speech communications, and the like are easily accomplished. When dismounting the photographing lens unit, a lens lock release button is pressed down.

Inside the camera body frame 1, a mirror box 5 of the shape of surrounding the light flux having passed through the photographing lens unit is disposed. The mirror box 5 contains a quick return mirror 6 held at the angel of 45° to guide the light having passed through the photographing lens unit to a penta prism 22 (see FIGS. 3A and 3B) and a finder ocular window 18.

The upper left (viewed from the front) of the camera is disposed with a release button 7, a main operating dial 8, a LCD display panel (external liquid crystal display device) 9, and an upper surface operation mode setting button 10 of a photographing system. The release button 7 is an activating switch for starting the photographing, and is configured such that at the first stroke, a SW1 (7a) is turned ON, and at the second stroke, a SW2 (7b) is turned ON. The main operating dial 8 sets a shutter speed and a lens iris value according to the operation mode at the photographing time. The LCD display panel 9 displays each operation mode of the camera.

The upper surface operation mode setting button 10 performs the setting of whether starting a continuous photographing by one time depression of the release button 7 or the photographing by one frame only (single photographing) or starting a self-photographing mode, and the like, and its setting situation is displayed in the LCD display panel 9. The content displayed in the LCD display panel 9 will be described later (see FIGS. 4A, 4B and 4C).

The upper center of the camera is disposed with a strobe unit 11 to pop up for the camera main body, a shoe groove 12 for mounting a flash, and a flash contact point 13.

The upper right (viewed from the front) of the camera is disposed with a photographing mode setting dial 14.

The right side surface of the camera is provided with a closable external terminal lid 15. As though covered by the lid 15, a video signal output jack 16 and a USB output connector 17 are disposed as an external interface.

The back surface of the camera is disposed with a finder ocular window 18 above on an optical axis center and a color liquid crystal monitor 19 capable of displaying an image. A main switch 43 prohibiting the entire operations of the digital single lens reflex camera and a sub-operating dial 20 are also disposed. The sub-operating dial 20 disposed at the side of the color liquid crystal monitor 19 plays an auxiliary role of the function of the main operating dial 8, and for example, is used for setting an exposure correction amount for an appropriate exposure amount calculated by an auto exposure device in an AE mode of the camera. In a manual mode, the shutter speed can be set by the main operating dial 8, and the lens iris value can be set by the sub-operating dial 20. The sub-operating dial 20 is also used as the display selecting device of the photographed image displayed in the color liquid crystal monitor 19.

Figure 3:
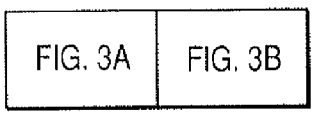
FIG. 3 is comprised of FIGS. 3A and 3B showing block diagrams for an electrical configuration of the digital single lens reflex camera of the present embodiment.
Figure 3A:
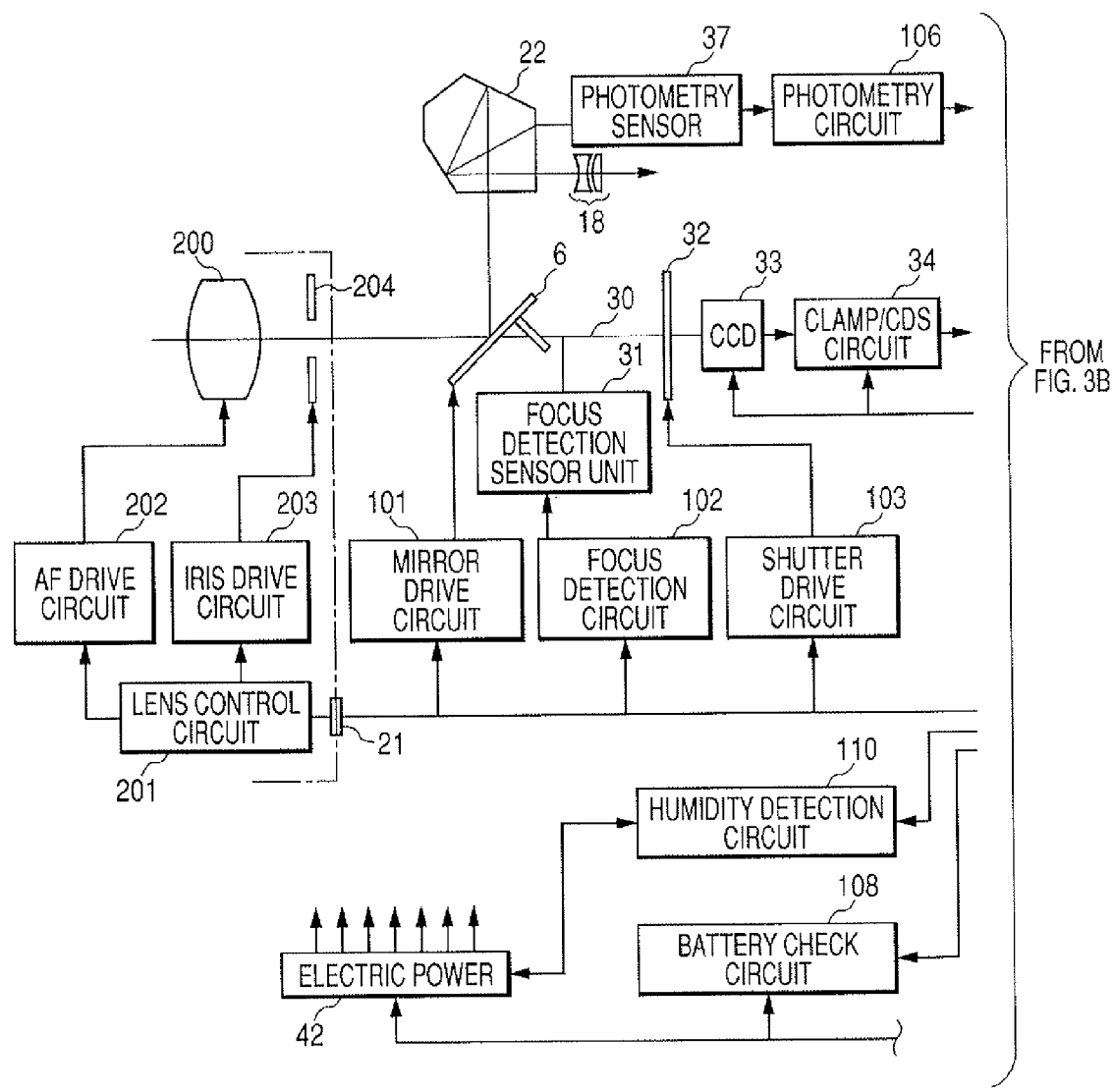
Figure 3B:
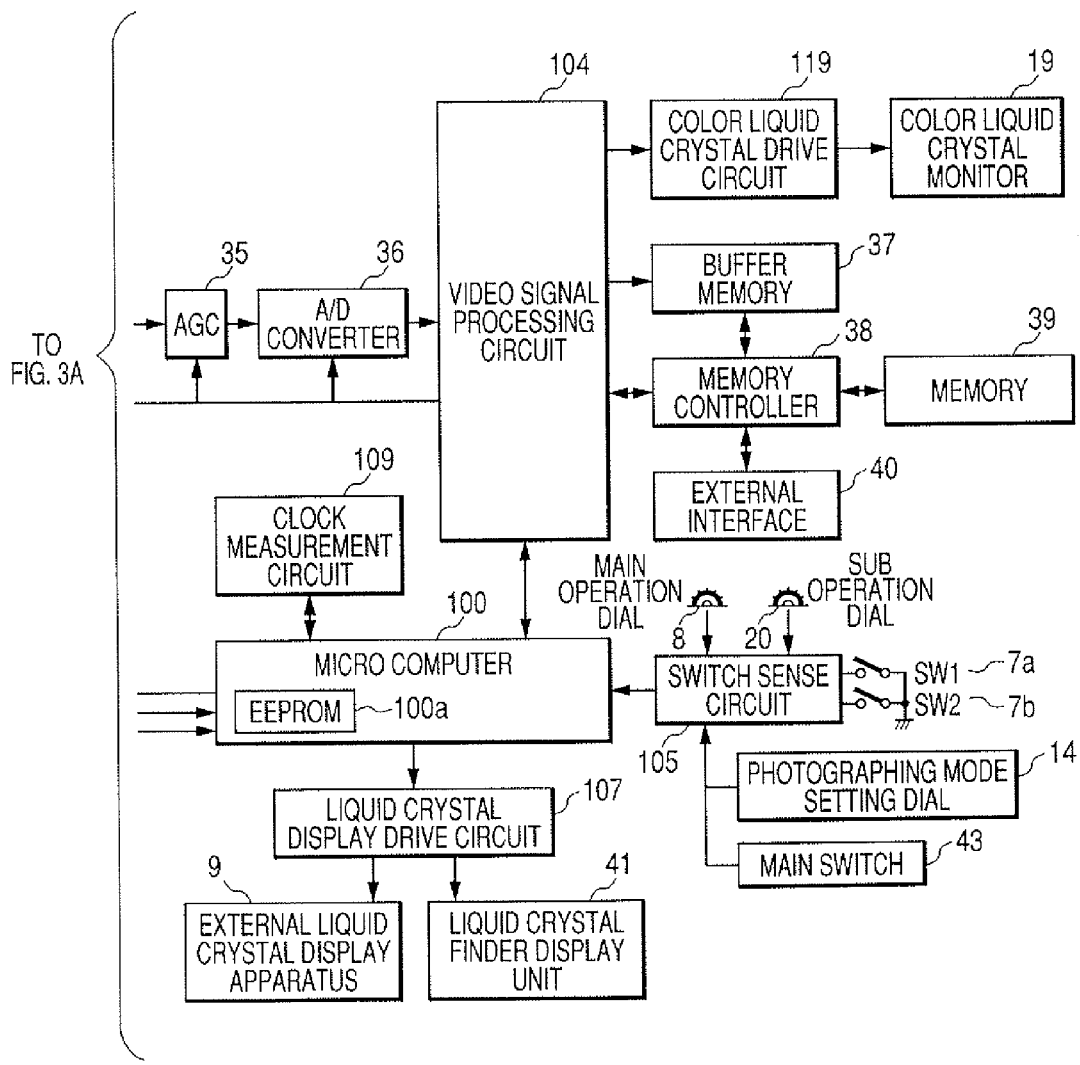

FIGS. 3A and 3B are block diagrams showing an electrical configuration of the digital single lens reflect camera. In FIGS. 3A and 3B, reference numeral 100 denotes the central processing unit (hereinafter, referred to as [MPU]) of a microcomputer contained in the camera main body. Reference numeral 100a denotes an EEPROM contained in the MPU 100, which stores clock information on a clock measurement circuit 109 and other photographing information.

The MPU 100 is connected with a mirror drive circuit 101, a focus detection circuit 102, a shutter drive circuit 103, a video signal processing circuit 104, a switch sense circuit 105, a photometry circuit 106, a liquid crystal display drive circuit 107, a battery check circuit 108, a clock measurement circuit 109, and a humidity detection circuit 110. The MPU 100 sequentially controls each of these component parts in the predetermined order.

The MPU 100 also performs communications through the lens control circuit 201 disposed inside the photographing lens unit and the mount contact point 21. The mount contact point 21 has also a function of transmitting a signal to the MPU 100 when connected to the photographing lens unit. As a result, it performs communications with the camera main body and the photographing unit, and can perform the driving of a photographing lens 200 and an iris 204 inside the photographing lens unit. As the photographing lens 200, one piece of the photographing lens is shown for convenience sake, but in practice, it is configured by a number of lenses.

Reference numeral 202 denotes an AF (auto focus) drive circuit, which is, for example, configured by a stepping motor. The AF drive circuit 202 focuses on a CCD 33 by changing a focus lens position inside the photographing lens 200 by a control by the lens control circuit 201 having received a command of the MPU 100.

Reference numeral 203 denotes an iris drive circuit, which is, for example, is configured by an auto iris and the like. The iris drive circuit 203 changes an optical iris value by changing an iris 204 by a control by the lens control circuit 201 having received a command of the MPU 100.

Reference numeral 6 denotes a main mirror (quick return mirror), which guides an object image formed by the photographing lens 200 to the penta prism 22, and also allows a part of the image to transmit and guides it to a focus detection sensor unit 31 through a sub-mirror 30 to be described later. The main mirror 6 is configured such that it can be moved to a position so that the object image is observable by a finder and to a withdrawal position at the photographing time so that the main mirror is moved back from the optical path of the object image light flux by the mirror drive circuit 101.

Reference numeral 30 denotes a sub-mirror, which allows an object light having transmitted a part of the main mirror 6 to reflect, and guides the light to the focus detection sensor unit 31. The sub-mirror 30 works with the main mirror 6 or the mirror drive circuit 101 of the main mirror 6. When the main mirror 6 is at a position so that the object image is observed by the finder, the sub-mirror 30 is configured to be movable to the position so that the object light is guided to the focus detection sensor 31 and to the withdrawal position at the photographing time so that the sub-mirror is moved back from the optical path of the object light.

Reference numeral 31 denotes a focus detection sensor unit of a phase difference system, and although not specifically illustrated, it is configured by a field lens disposed in the vicinity of an image forming surface, a reflecting mirror, a secondary image forming lens, an iris, and a line sensor comprising a plurality of CCDs, and the like.

Reference numeral 101 denotes a mirror drive circuit 101, which is, for example, configured by a DC motor, a gear train, and the like, and allows the main mirror 6 and the sub-mirror 30 to be driven by a control of the MPU 100.

Reference numeral 22 denotes a penta prism, which is an optical member which convert-reflects the object image guided by the main mirror 6 into an erect non-reverse image. The object image light flux having passed through the photographing lens 200 passes through the iris 204, and is reflected by the main mirror 6, and then guided to the penta prism 22, and thereby it is possible to observe the object image by a finder ocular window 18. The object image light is also guided to the photometry sensor 37. The light flux transmitted the main mirror 6 is reflected by the sub-mirror 30, and is image-formed again on the detection surface of the focus detection sensor unit 31 placed at a position approximately equivalent to the surface of the CCD 33. That optical image is converted into an electrical image signal, and is supplied to the focus detection circuit 102.

Reference numeral 102 denotes a focus detection circuit, which performs a storage control and read control of the focus detection sensor unit 31 according to the signal from the MPU 100, and outputs image information to the MPU 100. The MPU 100, based on the image signal of the object image from the focus detection circuit 102, performs a focus detection calculation by a phase difference detection method, and finds the difference between an image forming surface of the photographing lens 200 and the predetermined image forming surface such a film surface and the like, that is, a defocusing amount and a defocusing direction. The MPU 100, based on the calculated defocusing amount and the defocusing direction, changes the focus lens position within the photographing lens 200 through the lens control circuit 201 and the AF drive circuit 202, and drives it to a focused position.

Reference numeral 32 denotes a mechanical shutter device, which shuts out the object light flux at the finder observing time. The mechanical shutter device 32, although not specifically illustrated, is a focal plane shutter having a front blade group and a rear blade group. The front blade group moves back from the optical path of the object light flux according to the release signal at the photographing time, to start exposure. The rear blade group moves from the optical path of the object light flux at the finder observing time, and also shuts off the object light flux at the predetermined timing after the travel motion of the front blade group at the photographing time. The mechanical shutter device 32 is controlled by the shutter drive circuit 103 having received a command of the MPU 100. In the present embodiment, although the description has been made on the mechanical shutter device having both front blade group and the rear blade group, it may be configured such that the shielding member is only one piece, and when starting the exposure, the device moves back from the optical path of the object light flux, and after completion of the photographing, it returns to a position to shield the object light flux again.

Reference numeral 33 denotes a solid-state image pickup element, which picks up an object image formed by the photographing lens 200, and converts it into an electrical signal. The solid-state image pickup element 33 uses a CCD which is a two-dimensional photographing device. In the image pickup device, there are various types of forms such as CCD type, MOS type, CID type and the like, and any type of the form of the image pickup devices may be adapted. In the present embodiment, photoelectric conversion elements (photosensors) are two-dimensionally disposed, and an inter line CCD image pickup device is adopted, in which the signal charges accumulated at each sensor are outputted through a vertical transfer line and a horizontal transfer line.

Reference numeral 34 denotes a clamp/CDS (correlation double sampling) circuit, which performs a basic analogue processing before performing A/D conversion, and can also change the clamp level. Reference numeral 35 denotes an AGC (auto gain control), which performs a basic analogue processing before performing A/D conversion, and can also change the basic level of the AGC. Reference numeral 36 denotes an A/D converter, which converts an analogue output signal of the CCD 33 into a digital signal.

Reference numeral 104 denotes a video signal processing circuit, which takes in charge of the entire image processing of the digitalized image data of the CCD 33, attained by hard ware such as a gamma/knee processing, filter processing, monitor display information synthesizing processing, and the like. The monitor display image data from the video signal processing circuit 104 is displayed on the color liquid crystal monitor 19 through the color liquid crystal drive circuit 119. Switching over of these functions is performed by exchange of the data with the MPU 100. White balance information on the output signal of the CCD 33 can be outputted to the MPU 100 according to needs, and based on that information, the MPU 100 performs white balance adjustment and gain adjustment.

By the instruction from the MPU 100, the image data can be also stored in a buffer memory 37 through a memory controller 38 without doing any processing. The video signal processing circuit 104 has also a function of performing a compression processing such as JPEG and the like. Further, in the case of the continuous photographing, the image data is stored once in the buffer memory 37, and if the processing times take long, an unprocessed image data is read out through the memory controller 38, and then subjected to the image processing and the compression processing by the video signal processing circuit 104, thereby earning the continuous photographing speed. The number of the continuous photographing largely depends on the capacity of the buffer memory 37.

The memory controller 38 stores the unprocessed digital image data inputted from the video signal processing circuit 104 into the buffer memory 37, and then, stores the processed digital image data in a memory 39, and conversely, outputs the image data from the buffer memory 37 and the memory 39 to the video signal processing circuit 104. Further, the memory controller 38 can store the image data transmitted from an external interface 40 (equivalent to the video signal output jack 16 and the USB output connector 17 in FIG. 1) in the memory 39, and outputs the image data stored in the memory 39 from the external interface 40. The memory 39 can be detachably mounted on the camera main body.

Reference numeral 105 denotes a switch sense circuit, which controls each portion according to an operating state of each switch. Reference numeral 7a denotes a switch SW1 which is turned ON by a first stroke of a relay button 7. Reference numeral 7b denotes a switch SW2 which is turned ON by a second stroke of a relay button 7. When the switch SW2 is turned ON, a release operation is started. The switch sense circuit 105 is connected with the main operating dial 8, the sub-operating dial 20, the photographing mode setting dial 14, and the main switch 43, and transmits a state of each switch to the MPU 100. In the present embodiment, the switch sense circuit 105, the main switch 43 and the MPU 100 form together the power switch so-called by the present invention.

When it is detected that the power source is turned ON, the power supply from the power source 42 is started.

Reference numeral 106 denotes a photometry circuit, which outputs an output from the photometry sensor 37 to the MPU 100 as a luminance signal of each area of a screen. The MPU 100 A/D converts a luminance signal to calculate an exposure of the photographing.

Reference numeral 107 denotes a liquid crystal display drive circuit, which drives the external liquid crystal display device 9 and an intra-finder liquid crystal display device 41 according to a content display command from the MPU 100. The liquid crystal display drive circuit 107 can put a specific segment into a flashing display state by the instruction from the MPU 100.

Reference numeral 108 denotes a battery check circuit, which performs a battery check according to the signal from the MPU 100, and transmits its detection output to the MPU 100. In the present embodiment, the battery check circuit 108 and the MPU 100 form together the battery check device so-called by the present invention.

Reference numeral 109 denotes a clock measurement circuit, which measures date and a time from the turn-OFF of the main switch 43 to the next turn-ON, and transmits the measurement results to the MPU 100 by the instruction from the MPU 100. In the present embodiment, the clock measurement circuit 109 and the MPU 100 form together the measurement device so-called by the present invention.

Reference numeral 42 denotes a power source portion, which supplies a power source necessary to each IC (Integrated Circuit) and a drive system. In the present embodiment, the solid high polymer type fuel cell (hereinafter, referred to also as [fuel cell]) using hydrogen absorbing alloys is mounted. In the fuel cell, eight pieces of cells are connected in series, and the maximum 6.4 V can be outputted.

Reference numeral 110 denotes a moisture detection circuit, which is disposed in the cell portion configured inside the fuel cell 42, and measures the moisture by the instruction from the MPU 100, and transmits a measurement result to the MPU 100. As the moisture detection circuit 110, a semiconductor humidity sensor detecting a change of moisture adsorbed on the surface of a semiconductor thin film such as selenium (Se), germanium (Ge), vanadium nitride (Vn), and the like as a conductance change, a porous ceramic humidity sensor, and the like can be used. In the present embodiment, the moisture detection circuit 110 and the MPU 100 form together the moisture detection device so-called by the present invention.

Figure 4A:
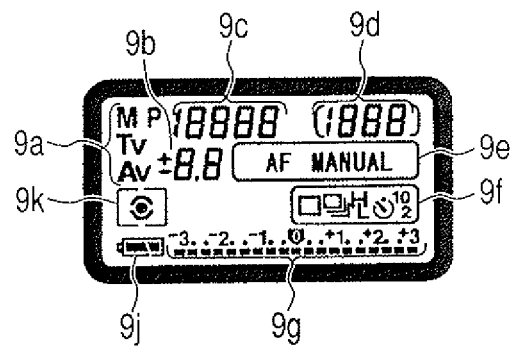
FIGS. 4A, 4B, and 4C are views showing display content of an external liquid crystal display device 9.
Figure 4B:
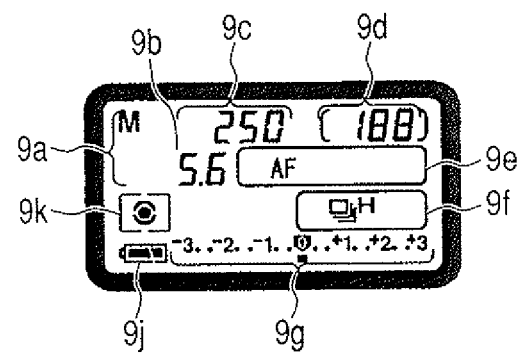
Figure 4C:
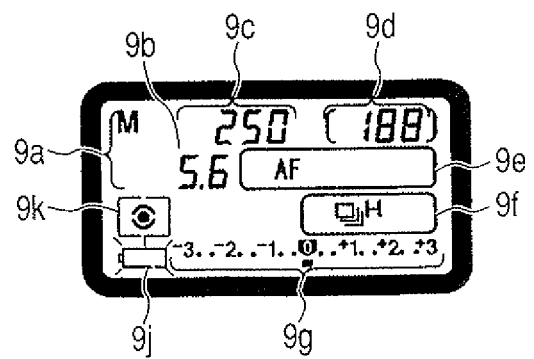

Here, referring to FIGS. 4A to 4C, the display content of the external liquid crystal display device 9 will be described. Reference numeral 9a denotes a display of a state of a photographing mode. Reference numeral 9b denotes a display of an iris value by seven segments. Reference numeral 9c denotes a display of a shutter speed by seven segments. Reference numeral 9d denotes a display of the number of sheets photographable. Reference numeral 9e denotes a display of a state of an AF mode. Reference numeral 9f denotes a display of a state of a drive mode. Reference numeral 9g denotes a display of an exposure correction amount by dots, and one dot represents ⅓ steps. Reference numeral 9j denotes a display of a criterion of the remaining power of the power source battery 35. Reference numeral 9k denotes a display of a state of a photometry mode.

Next, referring to FIGS. 5 to 7, the processing operation by the digital single lens reflex camera of the present embodiment will be described. At step S101, the MPU 100 determines whether the main switch 43 is turned OFF or not, through the switch sense circuit 105. When it is determined that the main switch 43 is turned OFF, the MPU 100 proceeds to step S102.

At step S102, the MPU 100 performs communications with the clock measurement circuit 109, and obtains the present time T1, and after storing it in an EEPROM 100a, proceeds to step S103.

At step S103, the MPU 100 determines whether the main switch 43 is turned ON or not, through the switch sense circuit 105. When determined that the main switch 43 is turned ON, the MPU 100 proceeds to step S104.

At step S104, the MPU 100 performs communications with the clock measurement circuit 109, and obtains the present time T2, and proceeds to step S105.

At step S105, the MPU 100 calls out the time T1 stored in the EEPROM 100a, and after that, proceeds to step S106. At step S106, the MPU 100 compares the time T1 and the time T2 to calculate an elapsed time T3.

At step S107, the MPU 100 compares the reference time T0 stored in advance in the EEPROM 100a and the elapsed time T3.

At step S107, when the reference time T0 is longer than the elapsed time T3, the MPU proceeds to step S108. At step S108, the battery check is started. In the present embodiment, the battery check is performed by a so-called direct current fall-of-potential method, in which the battery voltage is dropped by energizing the predetermined load (for example, resistor and the like) by the power source 42, and this dropped battery voltage is detected. That is, the MPU 100 issues an instruction to the battery check circuit 108, and allows the operation of the battery check circuit 108 to start. The battery check circuit 108 applies a load to the power source 42 for the predetermined time and obtains a battery voltage VBAT of the power source 42 to output it to the MPU 100.

At step S109, the MPU 100 compares the battery voltage VBAT measured at step S108 and a second reference voltage LVL2.

At step S109, when the battery voltage VBAT is judged higher than the second reference voltage LVL2, it is determined that the battery capacity is sufficient, and therefore, the MPU 100 proceeds to step S110, and starts the activating operation of the digital single lens reflex camera. After that, the MPU 100 proceeds to step S111, and waits in a standby state.

In contrast to this, at step S109, when the battery voltage VBAT is judged not higher than the second reference voltage LVL2, the MPU 100 generates a battery depleted signal, and proceeds to step S112. At step S112, the MPU 100 allows a warning display of a shortage of the battery capacity to be displayed in the external liquid crystal display device 9, and prompts a photographer to change the battery, and allows the camera operation to be stopped. A display example of the external liquid crystal display device 9 at this time is shown in FIG. 4C.

On the other hand, at step S107, when the reference time T0 is not longer than the elapsed time T3, the MPU proceeds to step S113. At step S113, the MPU 100 changes the level of the second reference voltage LVL2 to LVL3 (<LVL2), and proceeds to step S114. At step S114, the battery check is started.

That is, the MPU 100 issues an instruction to the battery check circuit 108, and allows the operation of the battery check to start, and obtains the battery voltage VBAT, and proceeds to step S115. Since the operation at step S114 is the same as the already described step S108, the description thereof will be omitted.

At step S115, the MPU 100 compares the battery voltage VBAT measured at step S114 and the changed second reference voltage LVL3.

At step S115, when the battery voltage VBAT is judged higher than the changed second reference voltage LVL3, it is determined that the battery capacity is sufficient, and therefore, the MPU 100 proceeds to step S116, and allows the activating operation of the digital single lens reflex camera to start. After that, the MPU 100 proceeds to step S111, and wait in a standby state.

In contrast to this, at step S115, when the battery voltage VBAT is judged not higher than the changed second reference voltage LVL3, the MPU 100 generates the battery depleted signal, and proceeds to the already described step S112.

Figure 6:
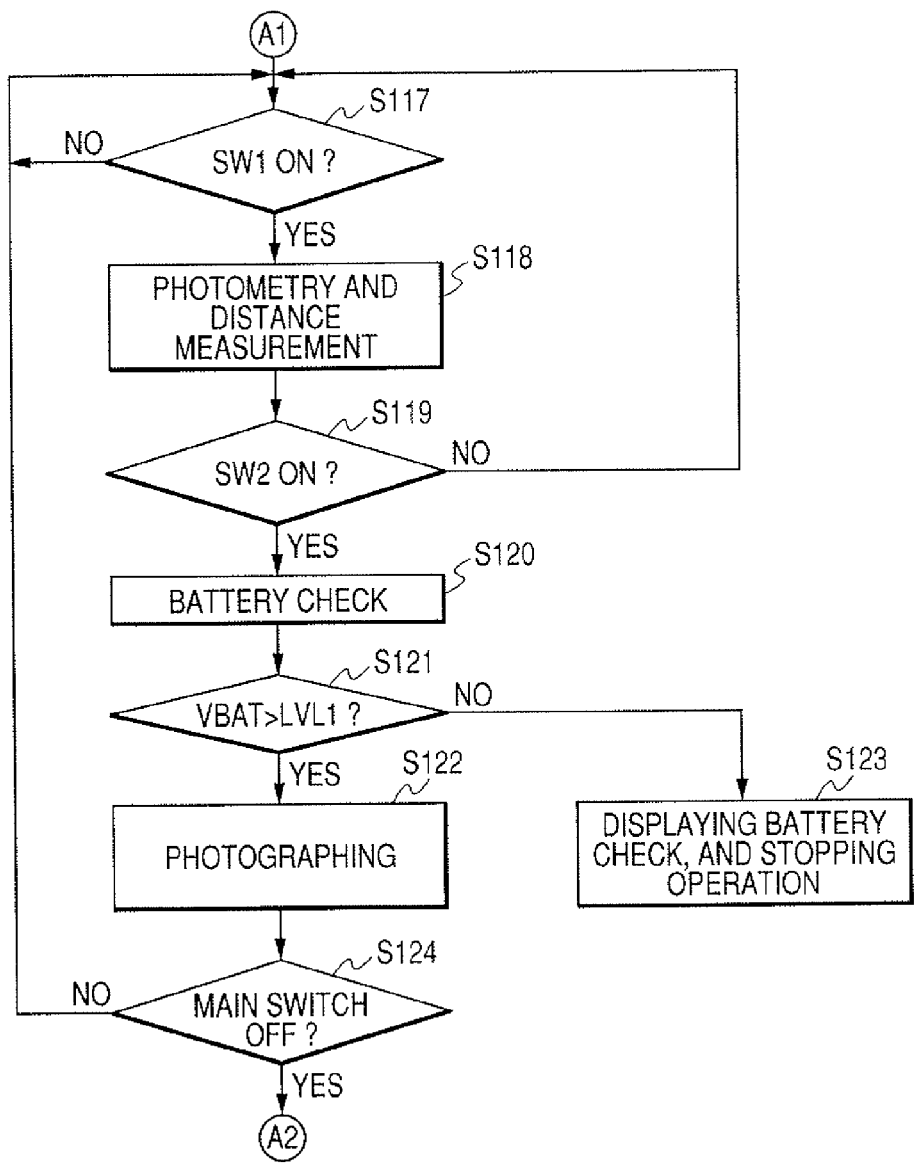
FIG. 6 is a flowchart for explaining the processing operation of the digital single lens reflex camera of a first embodiment.

Shifting the description to FIG. 6, at step S117, the MPU 100 detects whether the photometry and distance measurement start switch SW1 (7a) is turned ON or not. If the photometry and distance measurement start switch SW1 (7a) is turned ON, the MPU 100 proceeds to step S118, and if not turned ON, the MPU 100 returns to step S117, and repeats step S117 until the switch SW1 is turned ON.

At step S118, the MPU 100 allows the photometry circuit 106 to operate so as to decide an exposure amount, and measures the light amount of the object by the photometry sensor 37 to calculate a shutter speed and an iris value of the lens from this luminance information, thereby deciding the exposure amount. Further, the MPU 100 detects a focal point position of the object, and allows the focus detection circuit 102 to be operated to move the photographing lens 200 to the focal point position, and calculates a defocus amount of a plurality of secondary optical images formed on an unillustrated area sensor of the focus detection sensor unit 31 by the phase difference detection system. Based on that calculation result, the MPU 100 moves the photographing lens 200 to the focus position, thereby performing a focusing operation. After that, the MPU 100 proceeds to step S119.

At step S119, the MPU 100 confirms whether the exposure start switch SW2 (7b) is turned ON or not. If the exposure start switch SW2 (7b) is turned ON, the MPU 100 proceeds to step S120, and if not turned ON, returns to step S117.

At step S120, the MPU 100 issues an instruction to the battery check circuit 108, and allows the operation of the battery check circuit 108 to start, and obtains the battery voltage VBAT, and proceeds to step S121.

At step S121, the MPU 100 compares the battery voltage VBAT measured at step S120 and the first reference voltage LVL1 (>LVL2).

At step S121, when the battery voltage VBAT is judged higher than the first reference voltage LVL1, it is determined that the battery capacity is sufficient, and therefore, the MPU 100 proceeds to step S122.

In contrast to this, at step S121, when the battery voltage VBAT is judged not higher than the first reference voltage LVL1, the MPU 100 generates the battery depleted signal, and proceeds to step S123 to allow a warning display of a shortage of the battery capacity to be displayed in the external liquid crystal display device 9 similarly to the already described step S112, and allows the camera operation to be stopped.

At step S122, the MPU 100 allows the photographing operation to start. Specifically, first, the mirror drive circuit 101 moves the main mirror 6 and the sub-mirror 30 to a mirror up position by a command of the MPU 100. After that, the MPU 100 transmits the iris value calculated at step S118 to the lens control circuit 201. The lens control circuit 201 drives the iris 204 by the iris drive circuit 203 up to the transmitted iris value.

Next, the MPU 100 starts charge accumulation of the CCD 33, and allows an unillustrated front blade group inside the mechanical shutter device 32 to be driven by the shutter drive circuit 103 (shutter is opened), and starts the exposure of the CCD 33. When the exposure time of the CCD 33 calculated at step S118 elapses, the shutter drive circuit 103 drives the rear blade group inside the mechanical shutter device 32 according to the instruction of the MPU 100, and closes the shutter and completes the exposure of the CCD 33.

The iris drive circuit 203 drives the iris 204 up to an open iris value, and the mirror drive circuit 101 moves the main mirror 6 and the sub-mirror 30 to a mirror down position. Next, the charge accumulation is performed for the predetermined time. Then, the MPU 100 completes the charge accumulation of the CCD 33, then reads a charge signal from the CCD 33 to perform a series of analogue processings and perform the A/D conversion by the A/D converter 36, and input the signal to the video signal processing circuit 104.

After that, the signal is subjected to the predetermined image processing by the video signal processing circuit 104, and then subjected to a compression processing, and the data compressed by the memory controller 38 is stored in the memory 39, and a series of the photographing operations is completed, and then, the MPU 100 proceeds to step S124.

At step S124, the MPU 100 determines whether the main switch 43 is turned OFF or not, through the switch sense circuit 105. If determined that the main switch 43 is turned OFF, the MPU 100 proceeds to step S102, and when determined not turned OFF, returns to step S117.

Here, referring to FIG. 7, the relationship of the reference voltages LVL1, LVL2, and LVL3 will be described. FIG. 7 shows a general discharge curve of the solid high polymer fuel cell, where the axis of ordinate represents the voltage V, and the axis of abscissas represents the time T.

The VL1 shows a discharge curve when the power source is turned ON after a relatively short time (time judged as T0>T3 shown at step S107 of FIG. 5) elapses after the stopping of the camera (the main switch 43 is in an OFF state).

Figure 5:
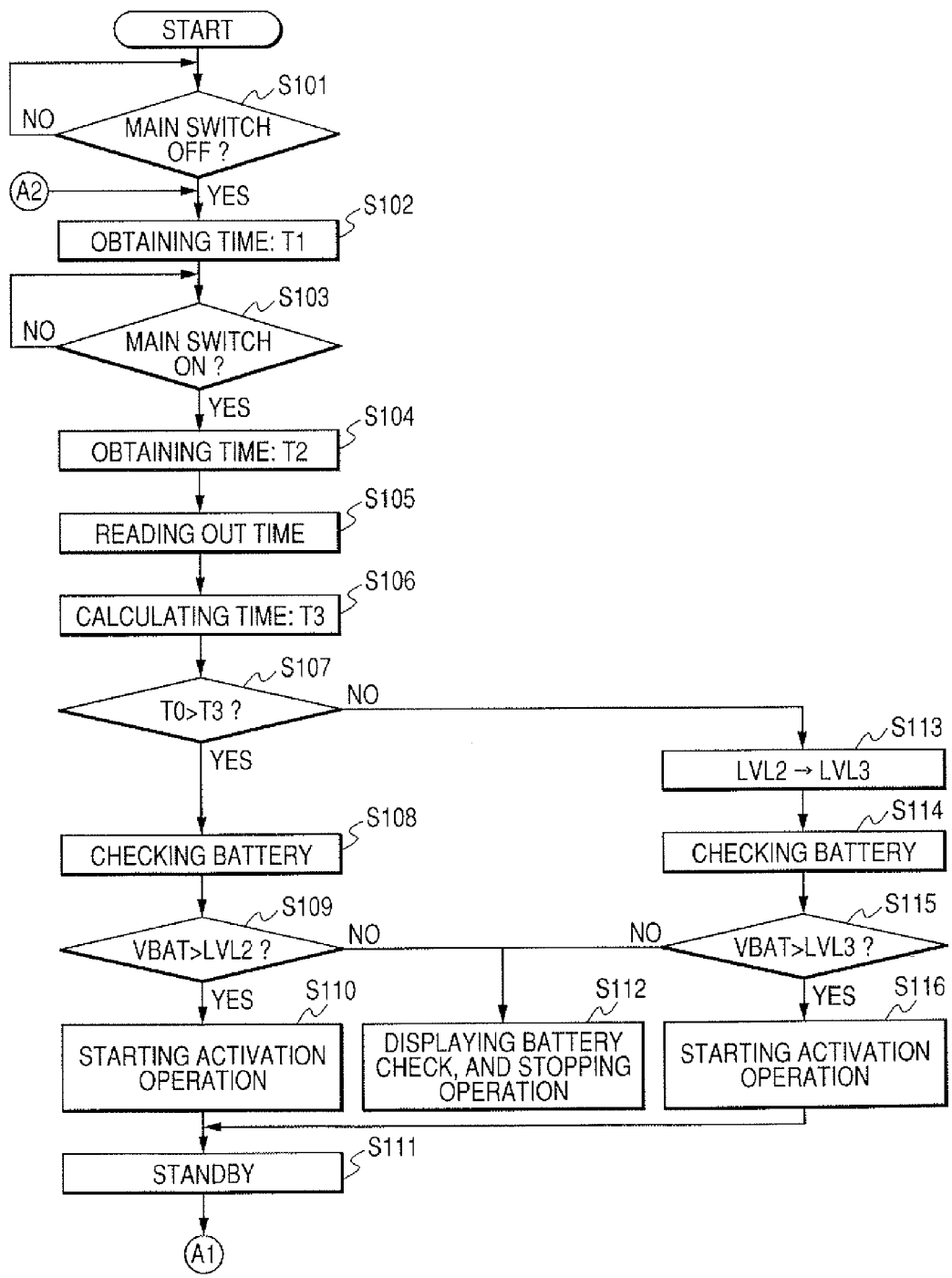
FIG. 5 is a flowchart for explaining the processing operation of the digital single lens reflex camera of a first embodiment.

On the contrary, the VL2 shows a discharge curve when the source power is turned ON after a relatively long time (time judged not T0>T3 but (TO≤T3) shown at step S107 of FIG. 5) elapses after the stopping of the camera (the main switch 43 is in an OFF state).

The first reference voltage LVL1 shows an inhibit voltage level (voltage level dropping below the voltage by which the camera is operable). When the already described battery check is performed and then it is judged to be the voltage below this LVL1 [V], the camera operation is stopped.

However, in the case of the fuel cell, at a start-up time, since a humidifying state of the sold high polymer film is low, the voltage becomes temporarily low, and after that, the power is discharged, so that the cell is humidified, and therefore, the voltage is immediately restored, and then the camera is put into an operable state. In this state in which the voltage is temporarily low, if the battery state is judged on the basis of the level of the first reference voltage LVL1, there is the possibility that the camera becomes inoperative.

Figure 7:
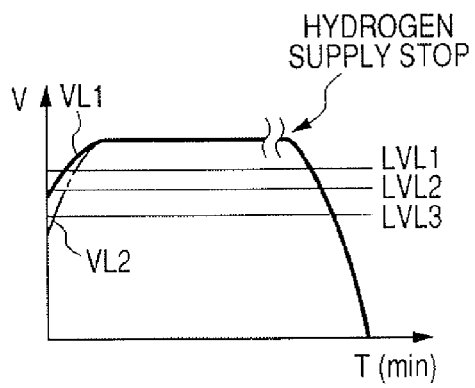
FIG. 7 is a characteristic view showing one example of the relationship between the discharge curve and the reference voltage of a fuel cell.

Hence, as shown in FIG. 7, the battery check is performed on the basis of the level of the second reference voltage LVL2 which is lower than the first reference voltage LVL1, so that the problem can be avoided (in the case of the discharge curve shown in VL1).

Incidentally, the discharge curve at a start-up time changes depending on the humidifying state of the solid high polymer film. That is, as a long time elapses after the main switch 43 is turned OFF, by that much, the solid high polymer film becomes dried. Hence, when a long time elapses (the discharge curve shown in VL2), if the battery state is judged on the basis of the level of the second reference voltage LVL2, there is the possibility that the camera becomes inoperative.

Hence, when a long time (time judged not TO>T3 but (TO≤T3), shown at step S107 of FIG. 5) elapses after the main switch 43 is turned OFF, the level is changed to the level of the LVL3 lower than the second reference voltage LVL2, and on the basis of that level of the changed second reference voltage LVL3, the battery state is judged, thereby this problem can be avoided.

As described above, immediately after the main switch 43 is turned ON, the battery check is performed based on the second inhibit voltage LVL2 lower than the first reference voltage LVL1 which is the inhibit voltage level in the ordinary operation. Consequently, even if the voltage is in a low state immediately after the main switch 43 is turned ON, it is possible to activate the camera without making an erroneous detection. Besides, only by changing a processing program by the MPU 100, an appropriate battery check can be performed, and therefore, miniaturization can be attained and a cost-up can be avoided.

Furthermore, when the elapsed time from a time when the main switch 43 is turned OFF to a time when turned ON next time is relatively long, the solid high polymer film inside the fuel cell is assumed to be in a further dried state, and thereby the second reference voltage LVL2 is changed. Consequently, even when the voltage fluctuates depending on the humidifying state immediately after the power switch is turned ON, an appropriate battery check can be performed.

Second Embodiment

Figure 8:
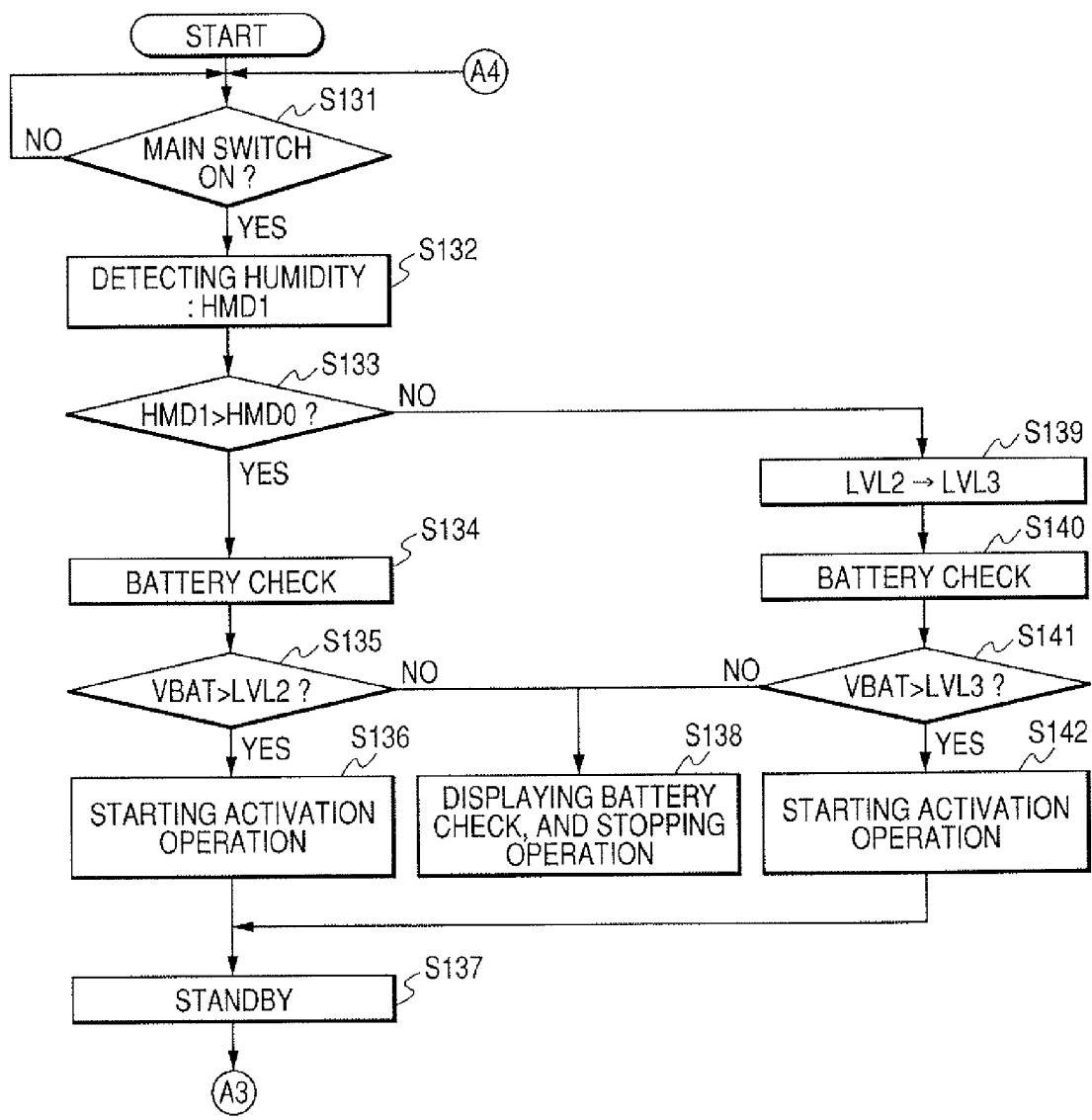
FIG. 8 is a flowchart for explaining the processing operation of the digital single lens reflex camera of a second embodiment.
Figure 9:
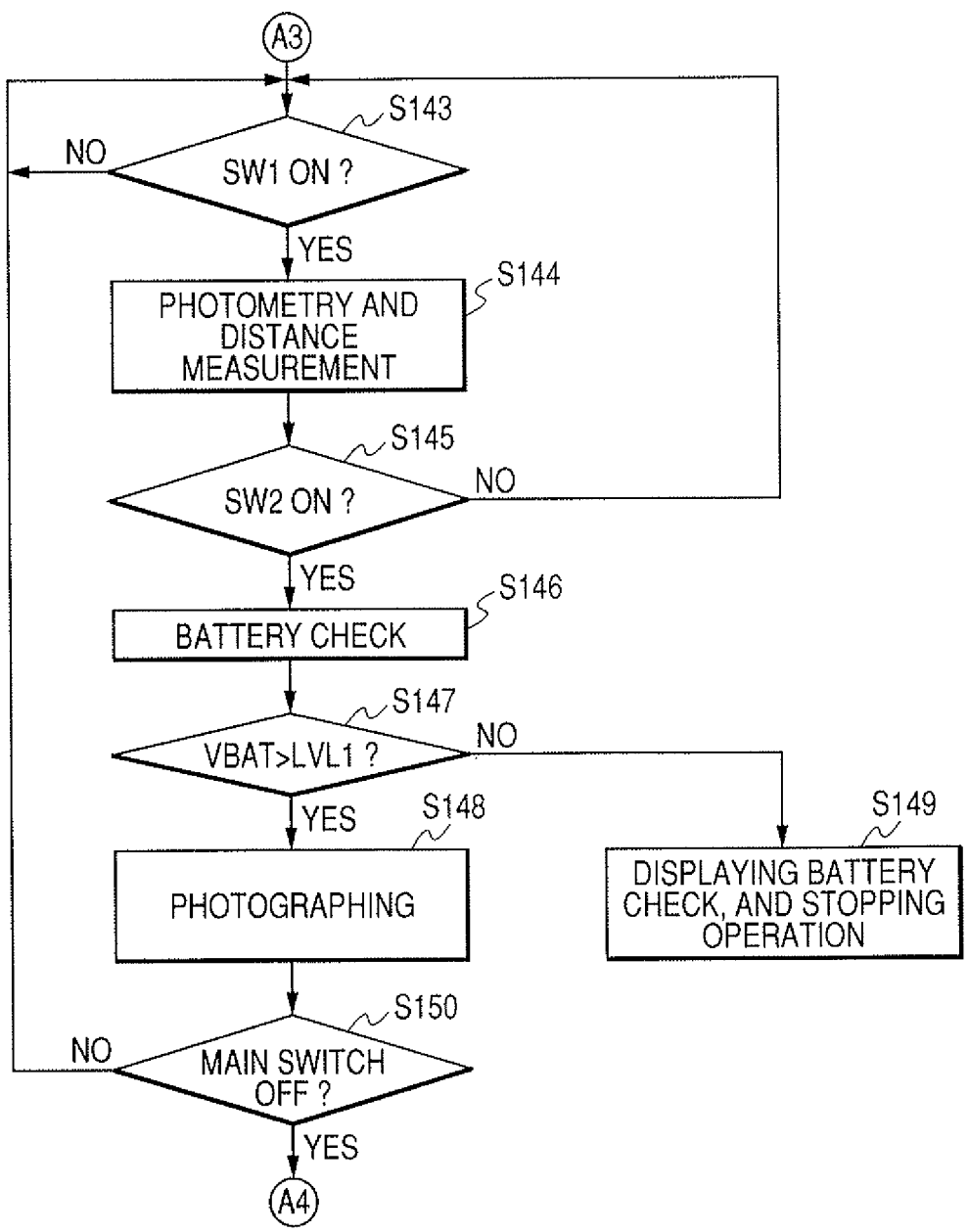
FIG. 9 is a flowchart for explaining the processing operation of the digital single lens reflex camera of a second embodiment.

Referring to FIGS. 8 to 9, a second embodiment will be described. The configuration of a digital single lens reflex camera of the second embodiment is the same as that described in the first embodiment, and the description thereof will be omitted.

At step S131, the MPU 100 determines whether the main switch 43 is turned ON or not, through the switch sense circuit 105. When determined that the main switch 43 is turned ON, the MPU proceeds to step S132.

At step S132, the MPU 100 issues an instruction to the humidity detection circuit 110 to detect a humidifying state HMD1 of a sold high polymer film inside the fuel cell 42, and transmits the detection result to the MPU 100, and proceeds to step S133.

At step S133, the MPU 100 calls out a reference humidity HMD0 stored in advance in the EEPROM 100a, and compares it with the humidifying state HMD1 obtained at step S132.

At step S133, when HMD1>HMD0, that is, when the humidifying state of the sold high polymer film is good, the MPU 100 proceeds to step S134. At step 134, a battery check is started. In the present embodiment, the predetermined load (for example, resistor and the like) is energized by the power source 42, so that the battery voltage is dropped, and the battery check is performed by a so-called direct current fall-of-potential method for detecting this dropped battery voltage. That is, the MPU 100 issues an instruction to the battery check circuit 108 to allow the operation of the battery check circuit 108 to start. The battery check circuit 108 applies a load for the predetermined time to the power source 42 to obtain a battery voltage VBAT of the power source 42, and outputs it to the MPU 100.

At step S135, the MPU 100 compares the battery voltage VBAT measured at step S134 and a second reference voltage LVL2.

At step S135, when the battery voltage VBAT is judged higher than the second reference voltage LVL2, since it is determined that the battery capacity is sufficient, the MPU 100 proceeds to step S136 to allow the activating operation of the digital single lens reflex camera to start. After that, the MPU 100 proceeds to step S136, and waits in a standby state.

In contrast to this, at step S135, when the battery voltage VBAT is judged not higher than the second reference voltage LVL2, the MPU 100 generates the battery depleted signal, and proceeds to step S138. At step S138, the MPU 100 allows a warning display of a shortage of the battery capacity to be displayed in the external liquid crystal display device 9 to prompt a photographer to replace the battery and stop the camera operation. A display example at the external liquid crystal display device 9 at this time is shown in FIG. 4C.

On the other hand, at step S133, when it is not HMD1>HMD0, but (HMD1≤HMD0), that is, when the humidifying state of a sold high polymer film is bad, the MPU 100 proceeds to step S139. At step S139, the MPU 100 changes the level of the second reference voltage LVL2 to LVL3 (<LVL2), and proceeds to step S140. At step S140, the battery check is started. That is, the MPU 100 issues an instruction to the battery check circuit 108 to allow the operation of the battery check circuit 108 to start, and obtains the battery voltage VBAT, and proceeds to step S141. The operation at step S140 is the same as that of the already described step S134, and the detailed description thereof will be omitted.

At step S141, the MPU 100 compares the battery voltage VBAT measured at step S140 and the changed second reference voltage LVL3.

At step S141, when the battery voltage VBAT is judged higher than the changed second reference voltage LVL3, since it is determined that the battery capacity is sufficient, the MPU 100 proceeds to step S142 to allow the activating operation of the digital single lens reflex camera to start. After that, the MPU 100 proceeds to step S137, and waits in a standby state.

In contrast to this, at step S141, when the battery voltage VBAT is judged not higher than the changed second reference voltage LVL3, the MPU 100 generates the battery depleted signal, and proceeds to the already described step S138.

After the standby state at step S137, the MPU 100 proceeds to step S143 of FIG. 9. The processing operations of steps S143 to S150 are the same as the processing operations of steps S117 to S124 of FIG. 6 described in the first embodiment, and the detailed description thereof will be omitted.

As described above, immediately after the main switch 43 is turned ON, the battery check is performed on the basis of the second inhibit voltage LVL2 lower than the first reference voltage LVL1 which is the inhibit voltage in the ordinary operation. Consequently, even if the voltage is in a low state immediately after the main switch 43 is turned ON, it is possible to activate the camera without making an erroneous detection. Besides, only by changing a processing program by the MPU 100, an appropriate battery check can be performed, and therefore, miniaturization can be attained and a cost-up can be avoided.

Furthermore, since the second reference voltage VLV2 is changed according to the humidifying state of the solid high polymer film, even when the voltage fluctuates depending on the humidifying state immediately after the power switch is turned ON, an appropriate battery check can be performed.

Third Embodiment

Referring to FIGS. 10, 11, 12A and 12B, a third embodiment will be described. The configuration of a digital single lens reflex camera of the third embodiment is the same as that described in the first embodiment, and the detailed description thereof will be omitted.

In the third embodiment, the battery check circuit 108 is configured to perform a battery check using three types of loads such as a first load, a second load, and a third load. In this case, there exists a relationship of the first load>the second load>the third load. For example, as disclosed in Japanese Patent Application Laid-Open No. H07-92523, the battery check circuit includes three types of resistors showing different values, and the battery check can be achieved by using and switching over these resistors (the resistor value of the first load>the resistor value of the second load>the resistor value of the third load).

Figure 10:
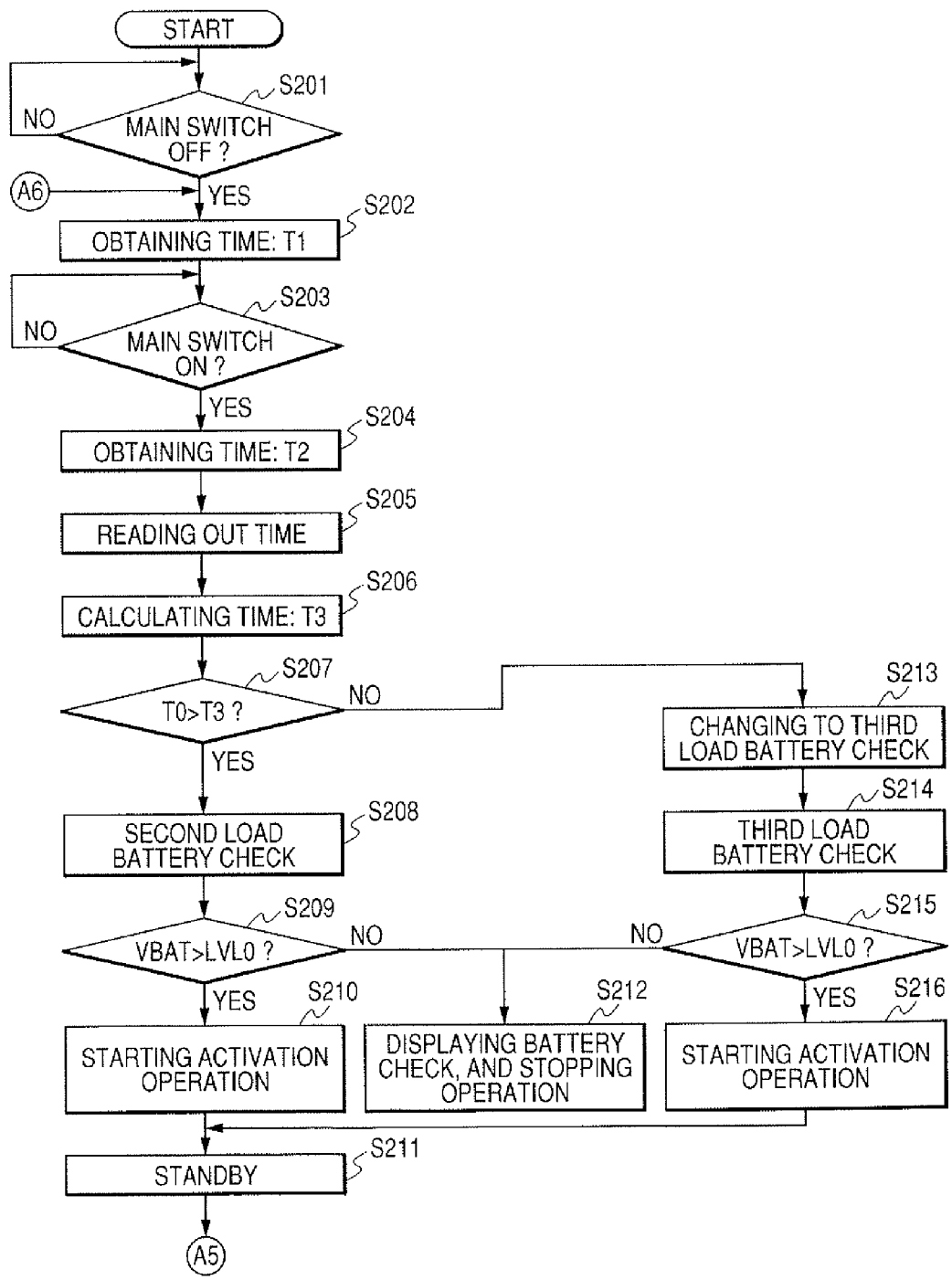
FIG. 10 is a flowchart for explaining the processing operation of the digital single lens reflex camera of a third embodiment.

The processing operations of steps S201 to S206 of FIG. 10 are the same as the processing operations of steps S101 to S106 of FIG. 5, and the detailed description thereof will be omitted.

At step S207, the MPU 100 compares a reference time T0 stored in advance in the EEPROM 100a and the elapsed time T3.

At step S207, when the predetermined time T0 is longer than the elapsed time T3, the MPU 100 proceeds to step S208. At step S208, the battery check is started. The battery check method of the third embodiment is the same as that of the first embodiment, and therefore, the description thereof will be omitted. The MPU 100 issues an instruction to the battery check circuit 108 to perform the battery check (BC) on the basis of the second load, and obtains a battery voltage VBAT of the power source 42, and outputs it to the MPU 100.

On the other hand, at step S207, when the predetermined time T0 is not longer than the elapsed time T3, the MPU proceeds to step S213. At step S213, the MPU 100 changes the second load to the third load, and proceeds to step S214. At step 214, the MPU 100 issues an instruction to the battery check circuit 108 to perform the battery check (BC) on the basis of the third load, and obtains a battery voltage VBAT of the power source 42, and outputs it to the MPU 100.

Following steps S209 to S212 and steps S215 and S216 are the same as the processing operations of steps S109 to S112 and steps S115 and S116 of FIG. 5 descried in the first embodiment, and the detailed description thereof will be omitted. However, in the present embodiment, the reference voltage LVL0 is constant during the battery check.

Figure 11:
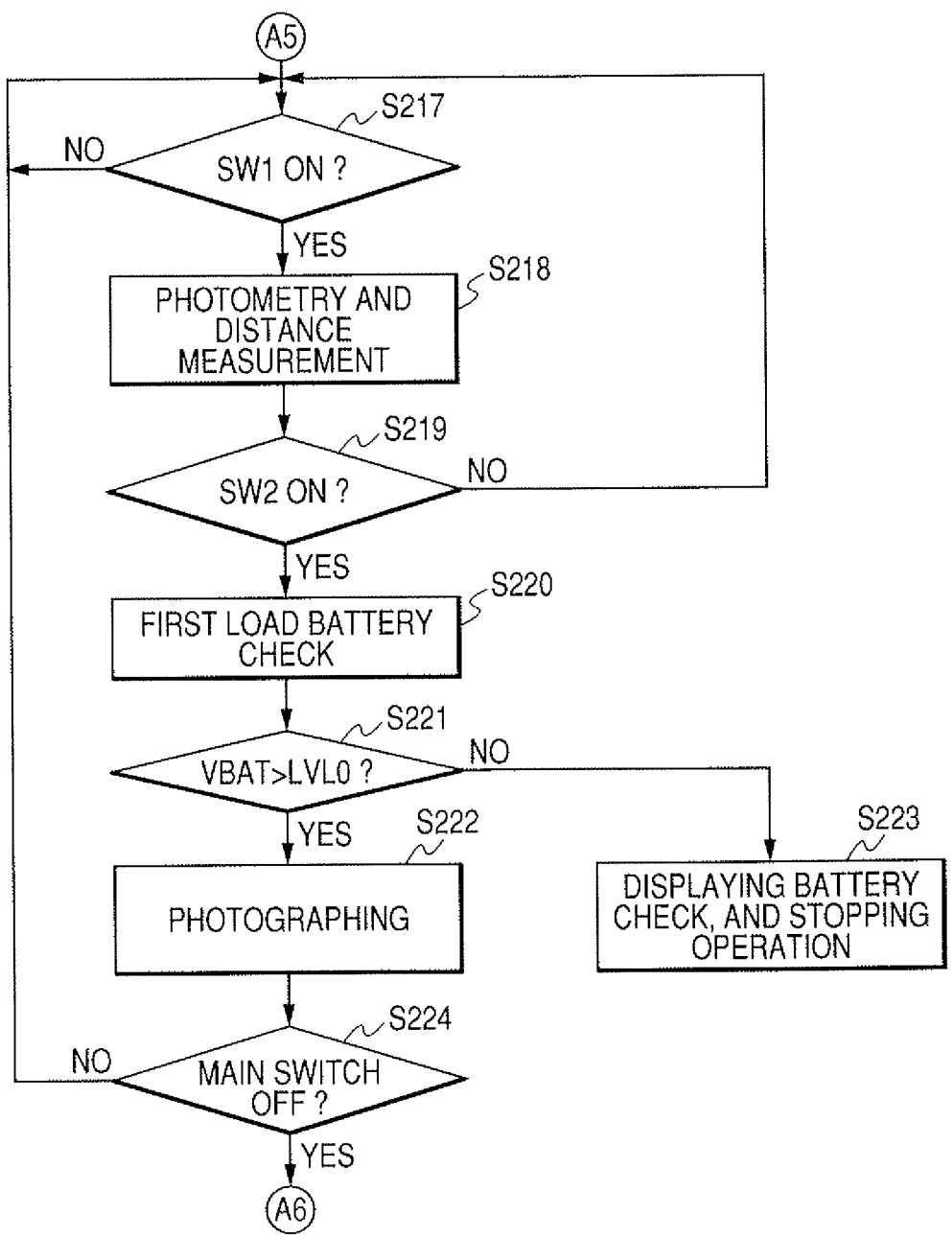
FIG. 11 is a flowchart for explaining the processing operation of the digital single lens reflex camera of a third embodiment.

After the standby state of step S211, the MPU 100 proceeds to step S217 of FIG. 11. The processing operations of steps S217 to S219 and steps S221 to S224 are the same as the processing operations of steps S117 to S119 and steps S121 to S124 of FIG. 6 described in the first embodiment, and the detailed description thereof will be omitted. However, in the present embodiment, the reference voltage LVL0 is constant during the battery check.

At step S220, the MPU 100 issues an instruction to the battery check circuit 108 to allow the operation of the battery check circuit 108 to start, and performs the battery check (BC) based on the first load, and obtains the battery voltage VBAT of the power source 42, and outputs it to the MPU 100.

Figure 12A:
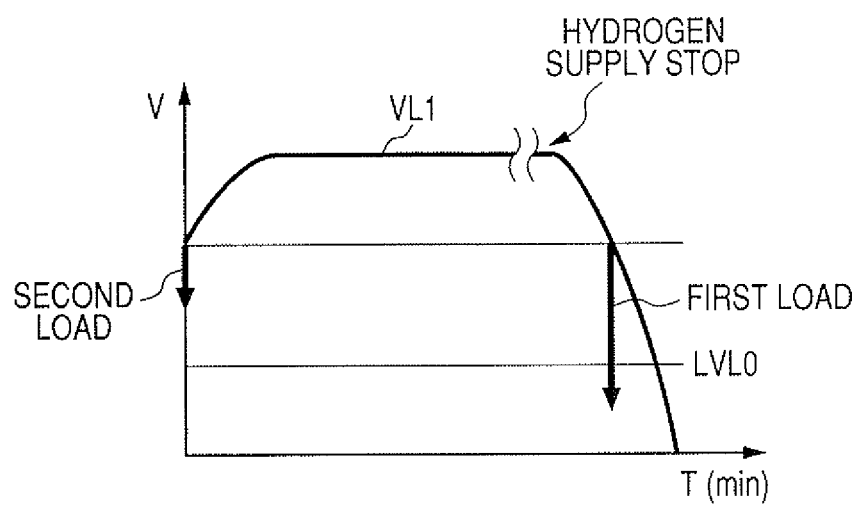
FIGS. 12A and 12B are characteristic views showing one example of the relationship between the discharge curve and the reference voltage of the fuel cell.
Figure 12B:
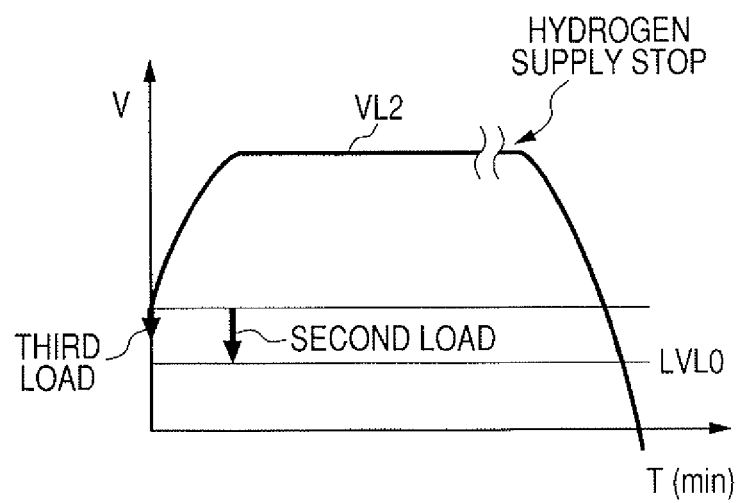

Here, reference to FIGS. 12A and 12B, the relationship among the first load, the second load, and the third load will be described. FIGS. 12A to 12B show a general discharge curve of a solid high polymer fuel cell, where the axis of ordinate shows the voltage V, and the axis of abscissas shows the time T.

The VL1 of FIG. 12A shows a discharge curve when the power source is turned ON after a relatively short time (time judged as T0>T3 shown at step S207 of FIG. 10) elapses after the stopping of the camera (the main switch 43 is in an OFF state).

In contrast to this, the VL2 of FIG. 12B shows a discharge curve when the source power is turned ON after a relatively long time (time judged as not T0>T3 but (TO≤T3) shown at step S207 of FIG. 10) elapses after the stopping of the camera (the main switch 43 is in an OFF state).

The length of an arrow mark of each load shows a dropping amount of the voltage by performing the battery check. When the voltage measured when the battery check is performed drops below an inhibit level LVL0, the operation of the camera is stopped.

As shown in FIG. 12A, when the battery check is performed based on the first load which is a load at the normal time, if it is a region where the supply of hydrogen is cut off and the voltage drops, there occurs no problem in judging here an inhibit level and stopping the camera.

However, at a start-up time, when the battery check is performed based on the first load, a problem arises that the camera is stopped despite of the fact that the voltage rises from now and the camera becomes operative.

Hence, at a start-up time, the battery check is performed based on the second load smaller than the first load, so that, as shown in FIG. 12A, the voltage is allowed not to drop below the inhibit voltage.

In the case of the fuel cell, if a humidifying state of the solid high polymer film is bad (not humidified), the voltage at a start-up time is lowered further. Particularly, when a long time elapses from a time when the main switch is turned OFF, the solid high polymer film is dried up.

Hence, at this time, by performing the battery check by using the third load smaller than the second load, the above described problems can be avoided. That is, as shown in FIG. 12B, if the battery check is performed based on the second load, the voltage drops to the inhibit level, but by performing the battery check by the third load, the voltage will not drop below the inhibit level.

As described above, immediately after the main switch 43 is turned ON, the battery check is performed based on the second load smaller than the first load which is the battery check load at the normal time. Consequently, even when the voltage is in a low state immediately after the main switch 43 is turned ON, it is possible to activate the camera without making an erroneous detection. Besides, only by changing a processing program by the MPU 100, an appropriate battery check can be performed, and therefore, miniaturization can be attained and a cost-up can be avoided.

Furthermore, when the elapsed time from a time when the main switch 43 is turned OFF to a time when turned ON next time is relatively long, the solid high polymer film inside the fuel cell is assumed to be in a further dried state, and the second load is changed to the third load. Consequently, even when the voltage fluctuates depending on the humidifying state immediately after the power switch is turned ON, an appropriate battery check can be performed.

Fourth Embodiment

Figure 13:
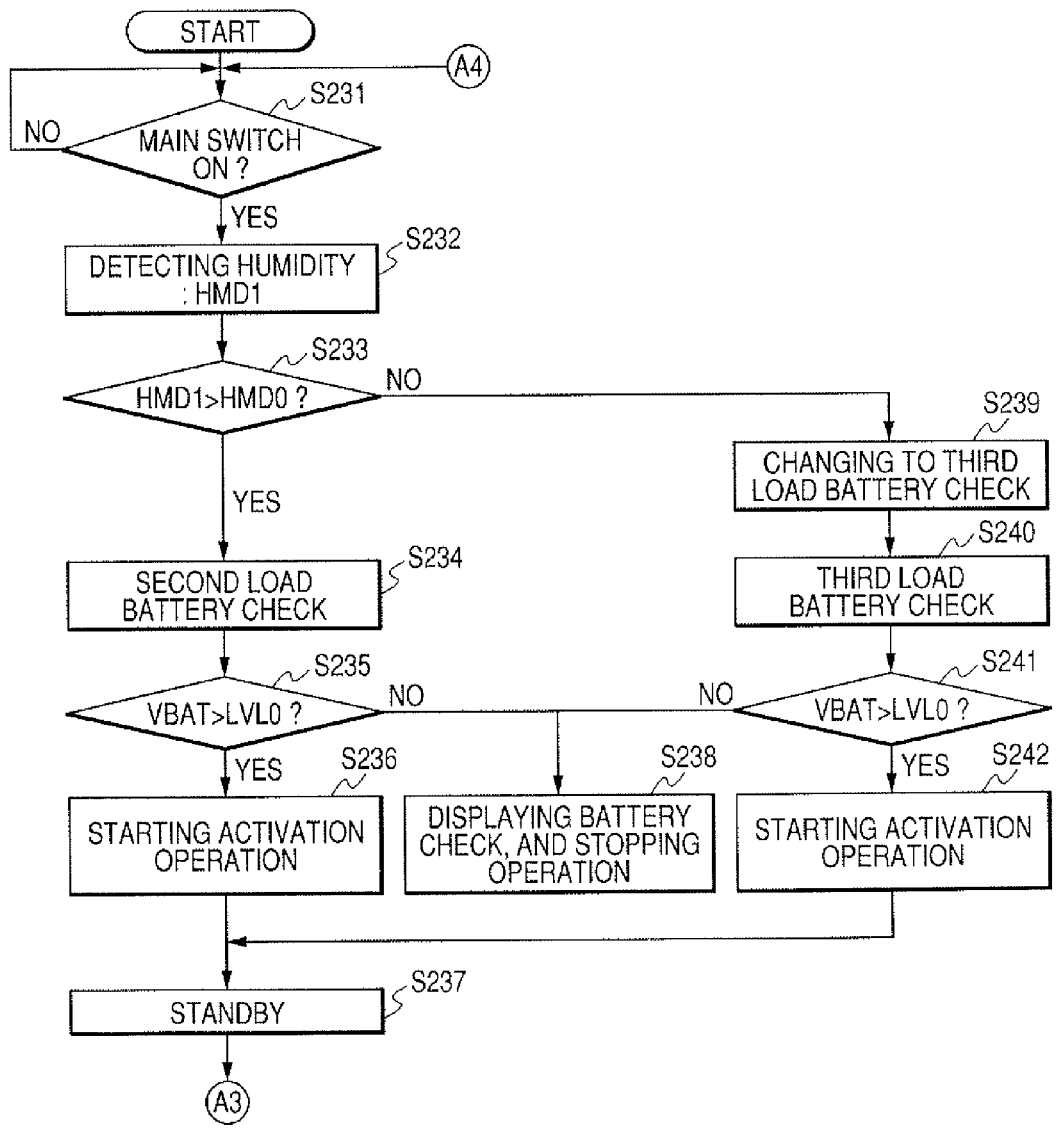
FIG. 13 is a flowchart for explaining the processing operation of the digital single lens reflex camera of a fourth embodiment.
Figure 14:
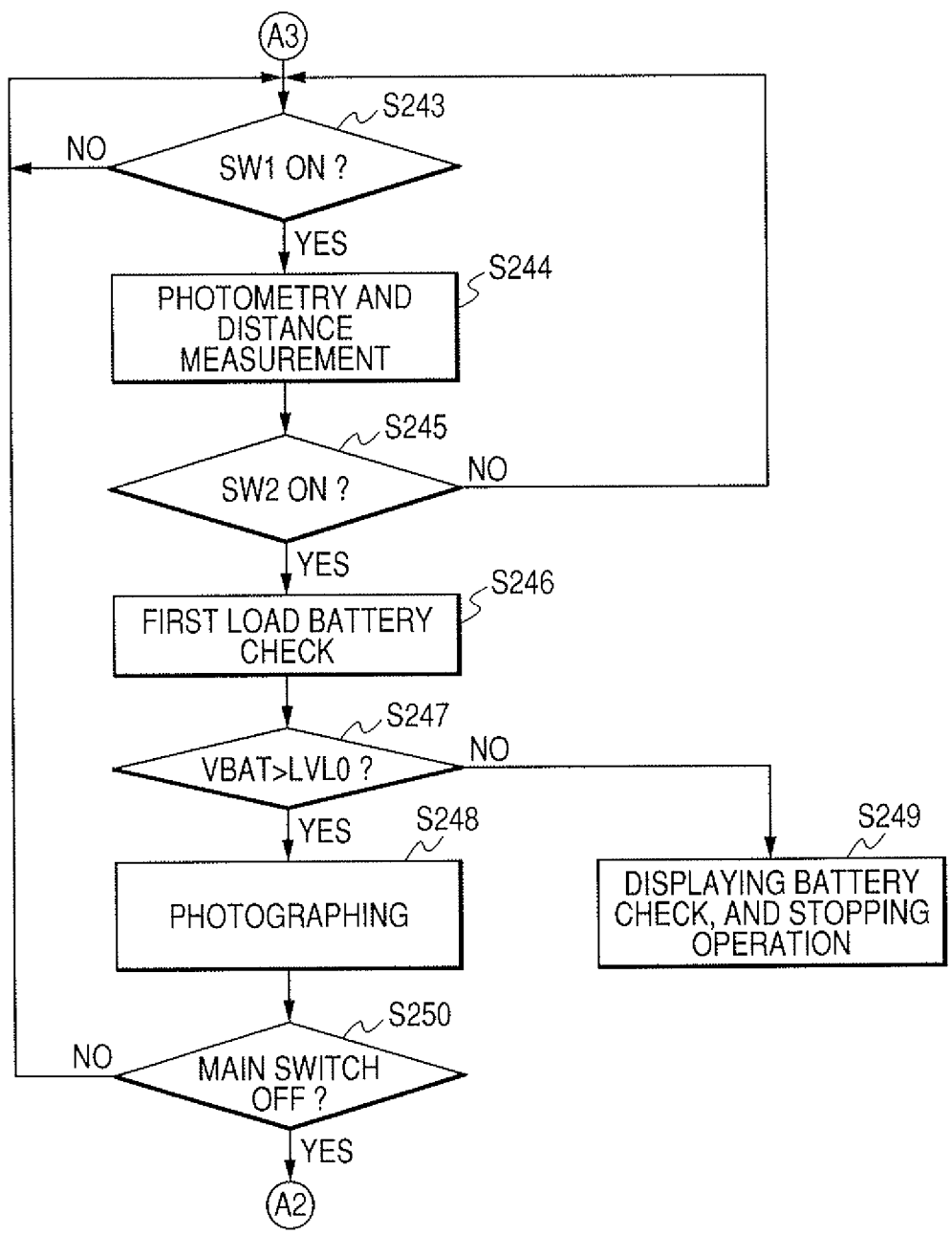
FIG. 14 is a flowchart for explaining the processing operation of the digital single lens reflex camera of a fourth embodiment.
Figure 16A:
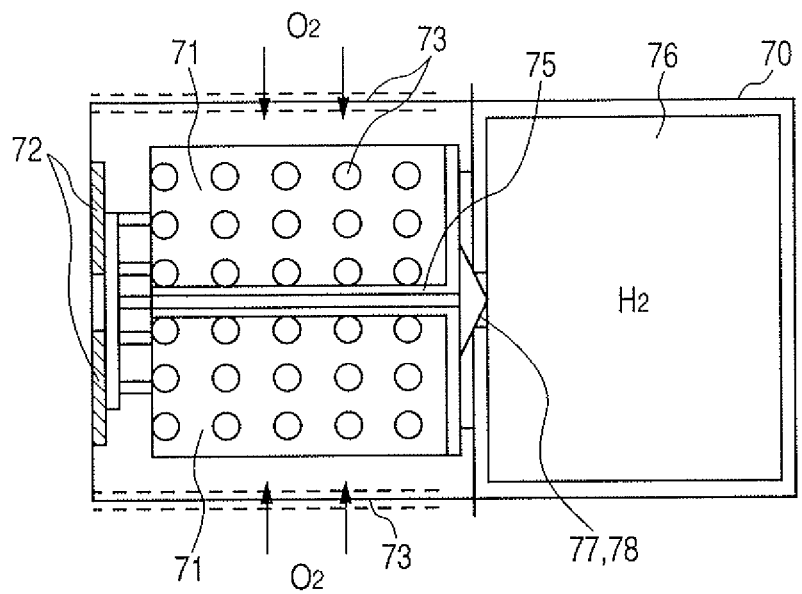
FIGS. 16A and 16B are views showing one example of the fuel cell.
Figure 16B:
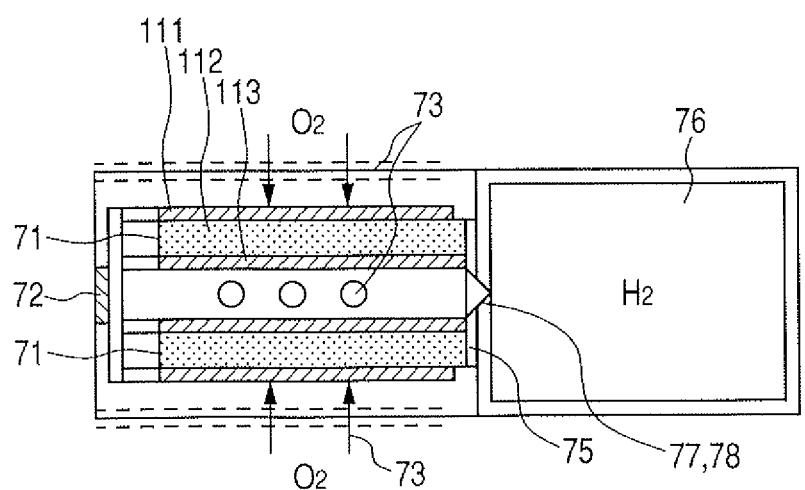
Figure 17:
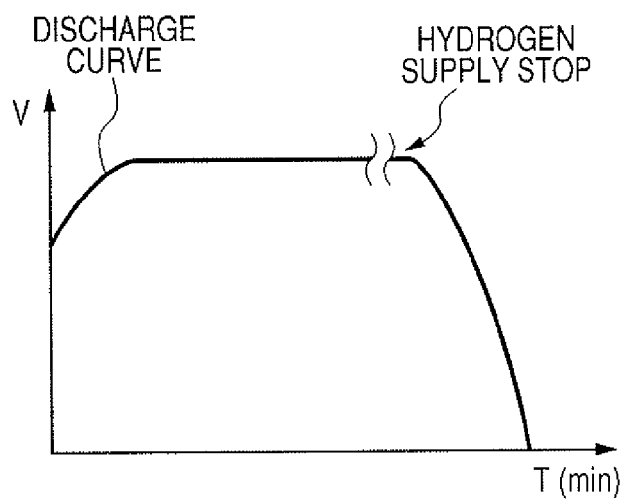
FIG. 17 is a characteristic view showing one example of the discharge curve of the fuel cell.

Referring to FIGS. 13 to 14, a fourth embodiment will be described. The configuration of a digital single lens reflex camera of the fourth embodiment is the same as that described in the third embodiment, and the detailed description thereof will be omitted.

The processing operations of steps S231 to S232 of FIG. 13 are the same as those of steps S131 to S132 of FIG. 8 described in the second embodiment, and the detailed description thereof will be omitted.

At step S233, the MPU 100 calls out a reference humidity HMD0 stored in advance in the EEPROM 100a, and compares it with a humidifying state HMD1 obtained at step S232.

At step S233, when HMD1>HMD0, that is, when the humidifying state of the sold high polymer film is good, the MPU 100 proceeds to step S234. At step 234, the MPU 100 performs the battery check based on a second load, and obtains a battery voltage VBAT of the power source 42, and outputs it to the MPU 100.

On the other hand, at step S233, when it is not HMD1>HMD0, but (HMD1≤HMD0), that is, when the humidifying state of a sold high polymer film is bad, the MPU 100 proceeds to step S239. At step S239, the MPU 100 changes a second load to a third load, and proceeds to step S240. At step S240, the MPU 100 performs the battery check by a third load, and obtains a battery voltage VBAT of the power source 42, and outputs it to the MPU 100.

Following steps S236 to S238 and steps S241 and S242 after that are the same as the processing operations of steps S136 to S138 and steps S141 and S142 of FIG. 8 descried in the second embodiment, and the detailed description thereof will be omitted. However, in the present embodiment, the reference voltage at the battery check time is constant at LVL0.

After the standby state of step S237, the MPU 100 proceeds to step S243 of FIG. 14. The processing operations of steps S243 to S250 are the same as the processing operations of steps S217 to S224 of FIG. 11 described in the third embodiment, and the detailed description thereof will be omitted.

As described above, immediately after the main switch 43 is turned ON, the battery check is performed based on the second load smaller than the first load which is a battery check load at the normal time. Consequently, even when the voltage is in a low state immediately after the main switch 43 is turned ON, it is possible to activate the camera without making an erroneous detection. Besides, only by changing a processing program by the MPU 100, an appropriate battery check can be performed, and therefore, miniaturization can be attained and a cost-up can be avoided.

Furthermore, since the second load is changed according to the humidifying state of the sold high polymer film, even when the voltage fluctuates depending on the humidifying state immediately after the power switch is turned ON, an appropriate battery check can be performed.

Fifth Embodiment

Referring to FIG. 15, a fifth embodiment will be described. The configuration of a digital single lens reflex camera of the fifth embodiment is the same as that described in the first embodiment, and the detailed description thereof will be omitted.

At step S301, the MPU 100 determines whether the main switch 43 is turned ON or not, through the switch sense circuit 105. When determined that the main switch 43 is turned ON, the MPU proceeds to step S302.

At step S302, the battery check is started. In the present embodiment, the predetermined load (for example, resistor and the like) is energized by the power source 42, so that the battery voltage is dropped, and the battery check is performed by a so-called direct current fall-of-potential method for detecting this dropped battery voltage. That is, the MPU 100 issues an instruction to the battery check circuit 108 to allow the operation of the battery check circuit 108 to start. The battery check circuit 108 applies a load for the predetermined time to the power source 42 to obtain a battery voltage V1 (first voltage) of the power source 42, and outputs it to the MPU 100. The MPU 100 stores the first voltage V1 in the EEPROM 100a, and after that, proceeds to step S303.

At step S303, the MPU 100 allows a timer stored in advance in the EEPROM 100a to start, and at step S304, detects whether time is up or not. At step S304, when determined that time is up, the MPU 100 proceeds to step S305, and when determined that time is not up, the MPU 100 repeats the processing operation of step S304.

At step S305, the MPU 100 issues an instruction again to the battery check circuit 108 to allow the operation of the battery check circuit 108 to start. The battery check circuit 108 applies a load for a predetermined time to the power source 42, and obtains a battery voltage (second voltage) of the power source 42, and outputs it to the MPU 100, and proceeds to step S306.

At step S306, the MPU 100 compares the first voltage stored in the EEPROM 100a and the second voltage obtained at step S305.

At step S306, when the second voltage V2>the first voltage V1, it is determined that the fuel cell 42 is in a start up state (the slope of the change of the voltage is rising). The MPU 100 proceeds to step S307 to allow the activating operation of the digital single lens reflex camera to start, and proceeds to step S308, and waits in a standby state.

In contrast to this, at step S306, when it is not that the second voltage V2>the first voltage V1, it is determined that the fuel cell 42 is in a dropping state (the slope of the change of the voltage is descending). The MPU 100 determines that it is an inhibit voltage level, and generates a battery depleted signal, and proceeds to step S309.

At step S309, the MPU 100 allows a warning display of a shortage of the battery capacity to be displayed in the external liquid crystal display device 9, and prompts a photographer to change the battery, and stop the camera operation at step S310. A display example of the external liquid crystal display device 9 at this time is shown in FIG. 4C.

As described above, it is determined whether the voltage is in a start up state or a dropping state in accordance with the first voltage V1 and the second voltage V2 after elapse of the predetermined time. Consequently, even when the voltage is in a low state immediately after the main switch 43 is tuned ON, when it is determined as a start up state, it is possible to activate the camera without making an erroneous detection. Besides, only by changing a processing program by the MPU 100, an appropriate battery check can be performed, and therefore, miniaturization can be attained and a cost-up can be avoided.

Needless to mention, an object of the present invention is to provide the storage medium recorded with a program code of software for realizing functions of the above described embodiments to a system or a device, and is achieved by reading and executing the program code stored in the storage medium by a computer of the system or the device.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-317182, filed on Oct. 31, 2005, which is hereby incorporated by reference herein in its entirety.

What is claimed is:

1. An electronic equipment, comprising:
   a fuel cell for supplying an electric power to the electronic equipment;
   a power source switch for controlling start and stop of supply of the electric power of the fuel cell to the electronic equipment;
   a checking unit, which checks the electric power of the fuel cell; and
   a control unit, which controls the check unit,
   wherein the control unit measures a first time when the supply of the electric power of the fuel cell to the electronic equipment is stopped by the power source switch and a second time when the supply of the electric power of the fuel cell to the electronic equipment is started again by the power source switch, wherein the control unit calculates an elapsed time between the first time and the second time from the measurement results of the first time and the second time,
   wherein in a case where the elapsed time is shorter than a predetermined time set in advance, the control unit controls the checking unit so that the checking unit checks the electric power of the fuel cell using a first load, and
   wherein in a case where the elapsed time is longer than the predetermined time set in advance, the control unit controls the checking unit so that the checking unit checks the electric power of the fuel cell using a second load smaller than the first load.

2. The electronic equipment according to claim 1,
   wherein in a case where the elapsed time is shorter than a predetermined time set in advance, the checking unit checks the electric power of the fuel cell when the electric power of the fuel cell is supplied to the first load, and
   wherein in a case where the elapsed time is longer than the predetermined time set in advance, the checking unit checks the electric power of the fuel cell when the electric power of the fuel cell is supplied to the second load.

* * * * *